(12) United States Patent
Borchers et al.

(10) Patent No.: US 7,869,112 B2
(45) Date of Patent: Jan. 11, 2011

(54) BEAM SCANNING BASED ON TWO-DIMENSIONAL POLYGON SCANNER FOR DISPLAY AND OTHER APPLICATIONS

(75) Inventors: Bruce Borchers, Scotts Valley, CA (US); Roger A. Hajjar, San Jose, CA (US)

(73) Assignee: Prysm, Inc., San Jose, CA (US)

( * ) Notice: Subject to any disclaimer, the term of this patent is extended or adjusted under 35 U.S.C. 154(b) by 377 days.

(21) Appl. No.: 12/180,114

(22) Filed: Jul. 25, 2008

(65) Prior Publication Data

US 2010/0020377 A1    Jan. 28, 2010

(51) Int. Cl.
*G02B 26/08* (2006.01)
(52) U.S. Cl. .................................... 359/216.1
(58) Field of Classification Search .............. 359/198.1, 359/216.1–218.1
See application file for complete search history.

(56) References Cited

U.S. PATENT DOCUMENTS

| | | | |
|---|---|---|---|
| 3,025,161 A | 3/1962 | Thaddeus |
| 3,556,637 A | 1/1971 | Palmquist |
| 3,691,482 A | 9/1972 | Pinnow et al. |
| 3,750,189 A | 7/1973 | Fleischer |
| 4,165,154 A | 8/1979 | Takahashi |
| 4,307,320 A | 12/1981 | Kotera et al. |
| 4,401,362 A | 8/1983 | Maeda |
| 4,512,911 A | 4/1985 | Kotera et al. |
| 4,613,201 A | 9/1986 | Shortle et al. |
| 4,624,528 A | 11/1986 | Brueggemann |
| 4,661,419 A | 4/1987 | Nakamura |
| 4,707,093 A | 11/1987 | Testa |
| 4,816,920 A | 3/1989 | Paulsen |
| 4,923,262 A | 5/1990 | Clay |
| 4,979,030 A | 12/1990 | Murata |
| 5,080,467 A | 1/1992 | Kahn et al. |
| 5,089,907 A | 2/1992 | Yoshikawa et al. |
| 5,094,788 A | 3/1992 | Schrenk et al. |
| 5,122,905 A | 6/1992 | Wheatley et al. |
| 5,136,426 A | 8/1992 | Linden et al. |
| 5,138,441 A | 8/1992 | Tanaka |
| 5,140,604 A | 8/1992 | Alablanche et al. |
| 5,166,944 A | 11/1992 | Conemac |

(Continued)

FOREIGN PATENT DOCUMENTS

DE    10044603    4/2001

(Continued)

OTHER PUBLICATIONS

"Fuji Film Color Mosaic Excellent for Image Sensor CM-EXIS," http://www.fujifilm-ffem.com/downloads/Product%20Spotlight%20Color%20Mosaic.pdf (1 page) [accessed May 27, 2008].

(Continued)

*Primary Examiner*—Euncha P Cherry
(74) *Attorney, Agent, or Firm*—Perkins Coie LLP

(57) ABSTRACT

Scanning beam systems based on a two-dimensional polygon scanner with different reflective polygon facets tilted at different tilt facet angles to use rotations of the polygon scanner to scan optical beams both horizontally and vertically on a surface which can be a display screen or a printing surface.

20 Claims, 15 Drawing Sheets

U.S. PATENT DOCUMENTS

| | | | |
|---|---|---|---|
| 5,182,659 A | 1/1993 | Clay et al. | |
| 5,198,679 A | 3/1993 | Katoh et al. | |
| 5,255,113 A | 10/1993 | Yoshikawa et al. | |
| 5,269,995 A | 12/1993 | Ramanathan et al. | |
| 5,270,842 A | 12/1993 | Clay et al. | |
| 5,365,288 A | 11/1994 | Dewald et al. | |
| 5,389,324 A | 2/1995 | Lewis et al. | |
| 5,414,521 A | 5/1995 | Ansley | |
| 5,473,396 A | 12/1995 | Okajima et al. | |
| 5,475,524 A | 12/1995 | Harris | |
| 5,477,285 A | 12/1995 | Riddle et al. | |
| 5,477,330 A | 12/1995 | Dorr | |
| 5,491,578 A | 2/1996 | Harris | |
| 5,526,166 A | 6/1996 | Genovese | |
| 5,541,731 A | 7/1996 | Freedenberg et al. | |
| 5,550,667 A | 8/1996 | Krimmel et al. | |
| 5,587,818 A | 12/1996 | Lee | |
| 5,594,556 A | 1/1997 | Vronsky et al. | |
| 5,598,292 A | 1/1997 | Yoshikawa et al. | |
| 5,602,445 A | 2/1997 | Solanki et al. | |
| 5,614,961 A | 3/1997 | Gibeau et al. | |
| 5,633,736 A | 5/1997 | Griffith et al. | |
| 5,646,766 A | 7/1997 | Conemac | |
| 5,648,181 A | 7/1997 | Watanabe | |
| 5,666,174 A | 9/1997 | Cupolo, III | |
| 5,668,662 A | 9/1997 | Magocs et al. | |
| 5,670,209 A | 9/1997 | Wyckoff | |
| 5,684,552 A | 11/1997 | Miyamoto et al. | |
| 5,698,857 A | 12/1997 | Lambert et al. | |
| 5,715,021 A | 2/1998 | Gibeau et al. | |
| 5,716,118 A | 2/1998 | Sato et al. | |
| 5,870,224 A | 2/1999 | Saitoh et al. | |
| 5,882,774 A | 3/1999 | Jonza et al. | |
| 5,907,312 A | 5/1999 | Sato et al. | |
| 5,920,361 A | 7/1999 | Gibeau et al. | |
| 5,959,296 A | 9/1999 | Cyr et al. | |
| 5,973,813 A | 10/1999 | Takeuchi | |
| 5,976,424 A | 11/1999 | Weber et al. | |
| 5,978,142 A | 11/1999 | Blackham et al. | |
| 5,994,722 A | 11/1999 | Averbeck et al. | |
| 5,998,925 A | 12/1999 | Shimizu et al. | |
| 6,008,925 A | 12/1999 | Conemac | |
| 6,010,751 A | 1/2000 | Shaw et al. | |
| 6,057,953 A | 5/2000 | Ang | |
| 6,064,417 A | 5/2000 | Harrigan et al. | |
| 6,066,861 A | 5/2000 | Hohn et al. | |
| 6,080,467 A | 6/2000 | Weber et al. | |
| 6,088,163 A | 7/2000 | Gilbert et al. | |
| 6,101,032 A | 8/2000 | Wortman et al. | |
| 6,117,530 A | 9/2000 | Jonza et al. | |
| 6,118,516 A | 9/2000 | Irie et al. | |
| 6,128,131 A | 10/2000 | Tang | |
| 6,134,050 A | 10/2000 | Conemac | |
| 6,154,259 A * | 11/2000 | Hargis et al. | 359/599 |
| 6,157,490 A | 12/2000 | Wheatley et al. | |
| 6,172,810 B1 | 1/2001 | Fleming et al. | |
| 6,175,440 B1 | 1/2001 | Conemac | |
| 6,219,168 B1 | 4/2001 | Wang | |
| 6,224,216 B1 | 5/2001 | Parker | |
| 6,226,126 B1 | 5/2001 | Conemac | |
| 6,252,254 B1 | 6/2001 | Soules et al. | |
| 6,255,670 B1 | 7/2001 | Srivastava et al. | |
| 6,276,802 B1 | 8/2001 | Naito | |
| 6,288,817 B2 | 9/2001 | Rowe | |
| 6,329,966 B1 | 12/2001 | Someya et al. | |
| 6,333,724 B1 | 12/2001 | Taira et al. | |
| 6,417,019 B1 | 7/2002 | Mueller et al. | |
| 6,429,583 B1 | 8/2002 | Levinson et al. | |
| 6,463,585 B1 | 10/2002 | Hendricks et al. | |
| 6,531,230 B1 | 3/2003 | Weber et al. | |
| 6,576,156 B1 | 6/2003 | Ratna et al. | |
| 6,621,593 B1 | 9/2003 | Wang et al. | |
| 6,621,609 B1 | 9/2003 | Conemac | |
| 6,627,060 B1 | 9/2003 | Yum et al. | |
| 6,628,248 B2 | 9/2003 | Masumoto et al. | |
| 6,678,081 B2 | 1/2004 | Nishihata et al. | |
| 6,717,704 B2 | 4/2004 | Nakai | |
| 6,765,237 B1 | 7/2004 | Doxsee et al. | |
| 6,777,861 B2 | 8/2004 | Russ et al. | |
| 6,809,347 B2 | 10/2004 | Tasch et al. | |
| 6,809,781 B2 | 10/2004 | Setlur et al. | |
| 6,839,042 B2 | 1/2005 | Conemac et al. | |
| 6,853,131 B2 | 2/2005 | Srivastava et al. | |
| 6,900,916 B2 | 5/2005 | Okazaki et al. | |
| 6,905,220 B2 | 6/2005 | Wortman et al. | |
| 6,937,221 B2 | 8/2005 | Lippert et al. | |
| 6,937,383 B2 | 8/2005 | Morikawa et al. | |
| 6,947,198 B2 | 9/2005 | Morikawa et al. | |
| 6,986,581 B2 | 1/2006 | Sun et al. | |
| 6,987,610 B2 | 1/2006 | Piehl | |
| 7,068,406 B2 | 6/2006 | Shimomura | |
| 7,088,335 B2 | 8/2006 | Hunter et al. | |
| 7,090,355 B2 | 8/2006 | Liu et al. | |
| 7,181,417 B1 | 2/2007 | Langseth et al. | |
| 7,213,923 B2 | 5/2007 | Liu et al. | |
| 7,230,767 B2 | 6/2007 | Walck et al. | |
| 7,239,436 B2 | 7/2007 | Orttinger et al. | |
| 7,283,301 B2 | 10/2007 | Peeters et al. | |
| 7,302,174 B2 * | 11/2007 | Tan et al. | 396/155 |
| 2001/0050371 A1 | 12/2001 | Odaki et al. | |
| 2002/0003233 A1 | 1/2002 | Mueller-Mach et al. | |
| 2002/0008854 A1 | 1/2002 | Leigh Travis | |
| 2002/0024495 A1 | 2/2002 | Lippert et al. | |
| 2002/0050963 A1 | 5/2002 | Conemac et al. | |
| 2002/0122260 A1 | 9/2002 | Okazaki et al. | |
| 2002/0124250 A1 | 9/2002 | Proehl et al. | |
| 2002/0145685 A1 | 10/2002 | Mueller-Mach et al. | |
| 2002/0163702 A1 | 11/2002 | Hori et al. | |
| 2002/0185965 A1 | 12/2002 | Collins et al. | |
| 2003/0094893 A1 | 5/2003 | Ellens et al. | |
| 2003/0184209 A1 | 10/2003 | Russ et al. | |
| 2003/0184531 A1 | 10/2003 | Morikawa et al. | |
| 2003/0184842 A1 | 10/2003 | Morikawa et al. | |
| 2004/0027465 A1 | 2/2004 | Smith et al. | |
| 2004/0070551 A1 | 4/2004 | Walck et al. | |
| 2004/0145312 A1 | 7/2004 | Ouderkirk et al. | |
| 2004/0156079 A1 | 8/2004 | Marshall et al. | |
| 2004/0160516 A1 | 8/2004 | Ford | |
| 2004/0165642 A1 | 8/2004 | Lamont | |
| 2004/0184123 A1 | 9/2004 | Moikawa et al. | |
| 2004/0227465 A1 | 11/2004 | Menkara et al. | |
| 2004/0263074 A1 | 12/2004 | Baroky et al. | |
| 2005/0001225 A1 | 1/2005 | Yoshimura et al. | |
| 2005/0012446 A1 | 1/2005 | Jermann et al. | |
| 2005/0023962 A1 | 2/2005 | Menkara et al. | |
| 2005/0023963 A1 | 2/2005 | Menkara et al. | |
| 2005/0051790 A1 | 3/2005 | Ueda | |
| 2005/0093818 A1 | 5/2005 | Hatam-Tabrizi et al. | |
| 2005/0094266 A1 | 5/2005 | Liu et al. | |
| 2006/0066508 A1 | 3/2006 | Walck et al. | |
| 2006/0081793 A1 | 4/2006 | Nesterovic et al. | |
| 2006/0082873 A1 | 4/2006 | Allen et al. | |
| 2006/0132021 A1 | 6/2006 | Naberhuis et al. | |
| 2006/0221021 A1 | 10/2006 | Hajjar et al. | |
| 2006/0227087 A1 | 10/2006 | Hajjar et al. | |
| 2006/0262243 A1 | 11/2006 | Lester et al. | |
| 2007/0014318 A1 | 1/2007 | Hajjar et al. | |
| 2007/0183466 A1 | 8/2007 | Son et al. | |
| 2007/0187580 A1 | 8/2007 | Kykta et al. | |
| 2007/0187616 A1 | 8/2007 | Burroughs et al. | |
| 2007/0188417 A1 | 8/2007 | Hajjar et al. | |
| 2007/0206258 A1 | 9/2007 | Malyak et al. | |
| 2007/0228927 A1 | 10/2007 | Kindler et al. | |
| 2008/0018558 A1 | 1/2008 | Kykta et al. | |

| | | | |
|---|---|---|---|
| 2008/0066107 | A1 | 3/2008 | Moonka et al. |
| 2008/0068295 | A1 | 3/2008 | Hajjar |
| 2008/0235749 | A1 | 9/2008 | Jain et al. |
| 2008/0247020 | A1 | 10/2008 | Malyak et al. |

FOREIGN PATENT DOCUMENTS

| | | |
|---|---|---|
| EP | 0196862 | 10/1986 |
| EP | 0271650 | 6/1988 |
| EP | 1150361 | 10/2001 |
| JP | 56164826 | 12/1981 |
| JP | 2-199975 | 8/1990 |
| JP | 5232583 | 9/1993 |
| JP | 2000-49380 | 2/2000 |
| JP | 2001-210122 | 8/2001 |
| JP | 2001-316664 | 11/2001 |
| JP | 2002-83549 | 3/2002 |
| JP | 2006-323391 | 11/2006 |
| KR | 10-2001-0097415 | 11/2001 |
| WO | WO 90/12387 | 10/1990 |
| WO | WO 92/22109 | 12/1992 |
| WO | WO 00/20912 | 4/2000 |
| WO | WO 00/33389 | 6/2000 |
| WO | WO 01/24229 | 4/2001 |
| WO | WO 01/88609 | 11/2001 |
| WO | WO 02/11173 | 2/2002 |
| WO | WO 02/23962 | 3/2002 |
| WO | WO 02/33970 | 4/2002 |
| WO | WO 02/057838 | 7/2002 |
| WO | WO 2005/119797 | 12/2005 |
| WO | WO 2006/097876 | 9/2006 |
| WO | WO 2006/107720 | 10/2006 |
| WO | WO 2007/050662 | 5/2007 |
| WO | WO 2007/095329 | 8/2007 |
| WO | WO 2007/114918 | 10/2007 |
| WO | WO 2007/131195 | 11/2007 |
| WO | WO 2007/134329 | 11/2007 |
| WO | WO 2008/116123 | 9/2008 |

OTHER PUBLICATIONS

"Quantum Dots Explained," http://www.evidenttech.com/quantum-dots-explained.html (1 page) [accessed May 27, 2008].

"Reflection and retroreflection," Delta Technical Note—RS 101 http://www.delta.dk/C1256ED600446B80/sysOakFil/roadsensors%20techn%20info%20RS101/$File/RS101.pdf, revised: Jul. 10, 2004, 7 pages [accessed Oct. 23, 2008].

Collins et al., "Process Control of the Chlorobenzene Single-Step Liftoff Process with a Diazo-Type Resist," IBM J. Res. Develop. 26(5): 596-604 (Sep. 1982).

Cusano, D.A., "Cathodo-, Photo-, and D.C. -Electroluminescence in Zinc Sulfide Layers," Luminescence of Organic and Inorganic Materials, Kallman, H.P. and G.M. Spruch (Eds.), New York University, pp. 494-522 (1962).

Daud, A. et al., "Transparent $Y_2O_2S$:Eu3+ phosphor thin films grown by reactive evaporation and their luminescent properties," Journal of the Society for Information Display (SID), vol. 4, No. 3, pp. 193-196 (1996).

Donofrio, R.L. and C.H. Rehkopf, "Screen Weight Optimization," Journal of the Electrochemical Society, vol. 126, No. 9, pp. 1563-1567 (Sep. 1979).

Greer, J.A. et al., "38.4: P-53 Thin Film Phosphors Prepared by Pulsed-Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radiolocation), No. 5, pp. 779-794 (1946).

International Search Report and Written Opinion dated Aug. 29, 2008, for PCT/US2008/059603, filed Apr. 7, 2008, entitled: "Post-Objective Scanning Beam Systems".

International Search Report and Written Opinion dated Jul. 20, 2006 and International Preliminary Report on Patentability for dated Oct. 3, 2007 for PCT/US2006/11757, now WO 2006/107720, published on Oct. 12, 2006, entitled: "Display Systems and Devices Having Screens with Optical Fluorescent Materials".

International Search Report and Written Opinion dated Jun. 27, 2008 for PCT/US2008/057763, filed Mar. 20, 2008, entitled: "Delivering and Displaying Advertisement or Other Application Data to Display Systems".

International Search Report and Written Opinion dated Mar. 13, 2008 and International Preliminary Report on Patentability for dated Aug. 19, 2008 for PCT/US2007/004004, now WO 2007/095329, published on Aug. 23, 2007, entitled: "Servo-Assisted Scanning Beam Display Systems Using Fluorescent Screens".

International Search Report and Written Opinion dated May 28, 2008 for PCT/US06/41584, now WO 2007/050662, published on May 3, 2007, entitled: "Optical Designs for Scanning Beam Display Systems Using Fluorescent Screens," 9 pages.

Kalkhoran, N.M. et al., "LP-E: *Late News Poster*: Luminescence Study of Ion-Implanted $ZnGa_2O_4$ Thin Films on Flexible Organic Substrates," 1997 SID International Symposium Digest of Technical Papers (SID '97 Digest), vol. XVIII, pp. 623-626 (May 1997).

Kim, J.M. et al. "6.3: Development of 4-in. Full Color FED, Devices," 1997 SID International Symposium Digest of Technical Papers ( SID '97 Digest), vol. XVIII, pp. 56-59 (May 1997).

Kramer, C.J., "Hologon deflectors for graphic arts applications: an overview," SPIE Proceedings on Beam Deflection and Scanning Technologies 1454: 68-100 (1991).

Kramer, C.J., "Hologon deflectors incorporating dispersive optical elements for scan line bow correction," SPIE Proceedings on Holographic Optics: Design and Applications, 883: 230-244 (1988).

Loewen, E.G. et al., "Grating efficiency theory as it applies to blazed and holographic gratings," Applied Optics, vol. 16, No. 10, p. 2711-2721 (Oct. 1977).

McDonald, L. W. and A. C. Lowe (Eds.), *Display Systems, Design Applications*, John Wiley & Sons: Chichester, England, pp. 195-196 (1997).

Mezner, L.Z. et al., "P-23: Centrifugal Settling of High Resolution 1-in CRT Screens," 1994 SID International Symposium Digest of Technical Papers (SID '94 Digest), vol. XXV, pp. 520-522 (May 1994).

Morikawa, M. et al., "S11-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.

Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).

Nonogaki, S. et al., "Dry Process for Phosphor Screen Fabrication of Multicolored Cathode Ray Tubes," Research & Development in Japan, pp. 50-55 (1984).

Oki, K. and L. Ozawa, "A phosphor screen for high-resolution CRTs," Journal of the SID, vol. 3, No. 2, pp. 51-57 (Sep. 1995).

Pringsheim, P. and M. Vogel, *Luminescence of Liquids and Solids and its Practical Applications*, Interscience Publishers, Inc.: New York, N.Y., pp. 144-145 (1946).

Rowe, D.M., "Developments in holographic-based scanner designs," Proc. SPIE, Optical Scanning Systems: Design and Applications, Leo Beiser and Stephen F. Sagan, Eds. vol. 3131: 52-58 (1997).

Rynearson, R.L. et al., "Low-cost, mechanically rigid, high-aspect-ratio mirrors," SPIE Proceedings on Design, Fabrication, and Applications of Precision Plastic Optics 2600: 137-143 (1995).

Schermerhorn, J.D. et al., "15.5: A Grooved Structure for a Large High-Resolution Color ACPDP," 1997 SID International Symposium Digest of Technical Papers ( SID '97 Digest), vol. XVII, pp. 229-232 (May 1997).

Schlesinger et al., "Screening," Design, Development, and Fabrication of Ultra-High-Resolution Cathode Ray tube. Technical Report ECOM-00476, pp. 64-72, Feb. 1969.

Smith, D.C. et. al., "32.5: Late-News Paper: Crystalline-As-Deposited $CaGa_2S_4$:Ce via Low Temperature Metal Organic Chemical Vapor Deposition," 1995 SID International Symposium Digest of Technical Papers (SID '95 Digest), vol. XXVI, pp. 728-731 (May 1995).

Smith, W.J., "Scanner/f-0 and Laser Disk Collimator Lenses," Chapter 22 in Modern Lens Design: A Resource Manual, pp. 411-430, Boston, Mass.: McGraw-Hill, Inc., 1992.

Withnall et al., "Studies of UV stimulated luminesence from phosphors of commerical importance," Central Laser Facility Annual Report 2004/2005 http://www.clf.rl.ac.uk/Reports/2004-2005/pdf/64.pdf [accessed on May 23, 2008], 2 pages.

Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp. 149-152 (Oct. 1996).

Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996).

Županc-Mežnar, L. and M. Žumer, "26.4:Preparation of P43 Suspension and Screen-Quality Evaluation in 1-in. CRTs", 1997 SID International Symposium Digest of Technical Papers ( SID '97 Digest), vol. XVIII, pp. 440-443 (May 1997).

* cited by examiner

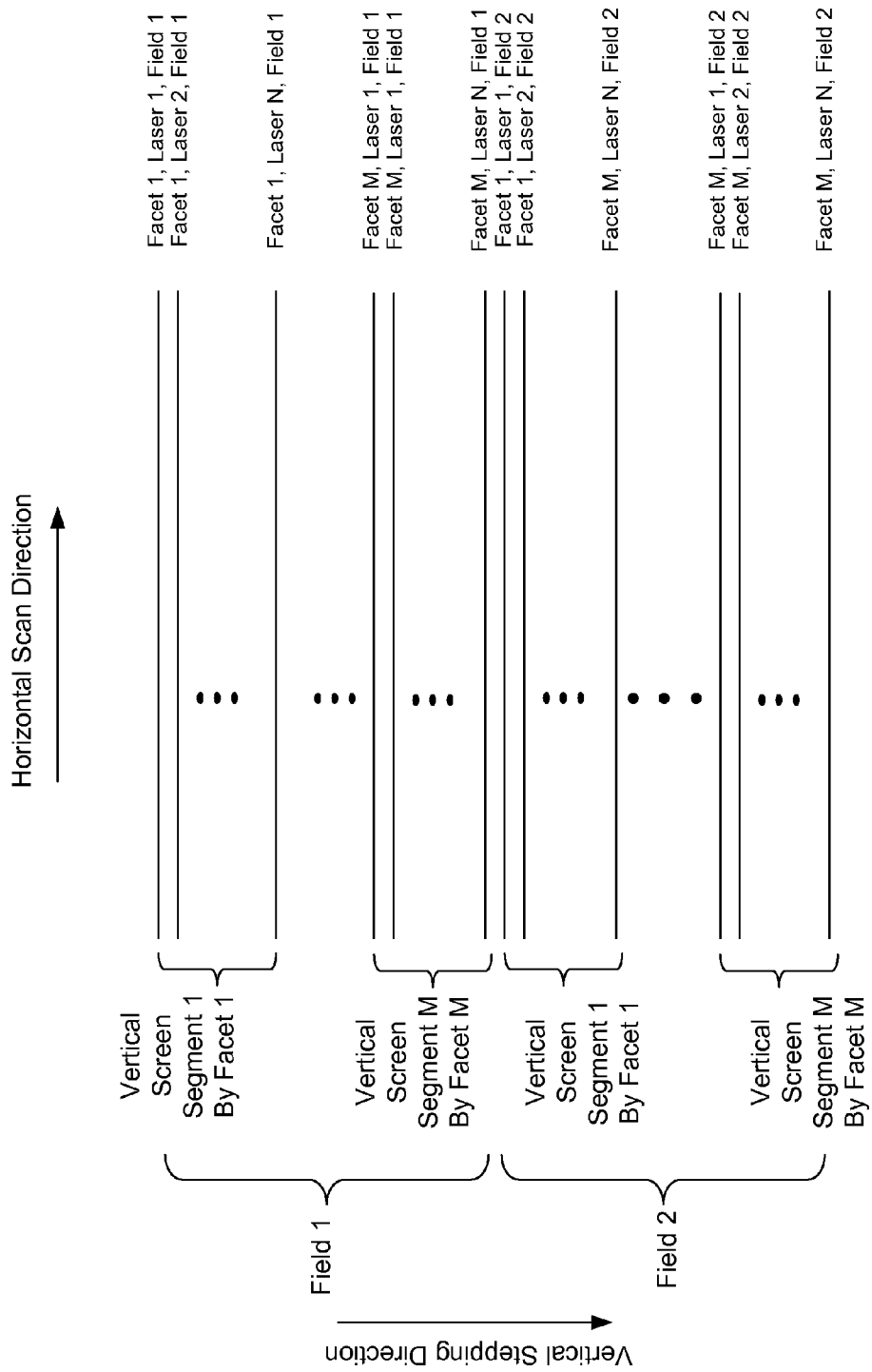

BEAM SCANNING BASED ON TWO-DIMENSIONAL POLYGON SCANNER FOR DISPLAY AND OTHER APPLICATIONS

BACKGROUND

This application relates to techniques, apparatus and systems for scanning beams by using polygon scanners.

Image and video displays can be designed to scan one or more optical beams on a screen. Polygon scanners can be used in such display systems. For example, some polygon-based display systems use one or more modulated optical beams that carry image information to produce images on screens by using a polygon scanner to scan an optical beam horizontally and a vertical scanner to scan the optical beam vertically. Such scanner systems can be used in systems other than display systems.

SUMMARY

This application provides techniques, apparatus and designs for scanning beam systems based on a two-dimensional polygon scanner with different reflective polygon facets tilted at different tilt facet angles to use rotations of the polygon scanner to scan optical beams horizontally while stepping them vertically on a surface such as a display screen or a printing or imaging surface.

In one aspect, a scanning beam system is provided to include an optical module operable to produce a plurality of optical beams modulated to carry images to scan over a surface to produce the images on the surface based on a two dimensional scanning pattern. The optical module includes a polygon scanner positioned in optical paths of the optical beams. The polygon scanner includes a rotation axis around which the polygon scanner rotates to scan the optical beams horizontally on the surface, a plurality of polygon facets that are sized to simultaneously receive the optical beams and comprise a plurality of reflective polygon facets are tilted with respect to the rotation axis at different facet tilt angles, respectively, to scan the optical beams horizontally at different vertical positions on the surface, respectively. This optical module also includes a vertical adjuster placed in the optical paths of the optical beams to control and adjust vertical positions of the optical beams on the surface; and a control unit that controls the vertical adjuster at a fixed position to place the optical beams at respective fixed vertical positions on the surface when the polygons scanner horizontally scans the optical beams to produce parallel horizontal lines on the surface.

In another aspect, a scanning beam system includes an optical module operable to produce a plurality of optical beams modulated to carry images to scan over a surface to produce the images on the surface. This optical module includes a polygon scanner positioned in optical paths of the optical beams and the polygon includes a rotation axis around which the polygon scanner rotates to scan the optical beams horizontally on the surface, and a plurality of polygon facets that are sized to simultaneously receive the optical beams and reflective to light of the optical beams. The polygon facets are tilted with respect to the rotation axis at different tilt angles, respectively, to scan the optical beams horizontally at different vertical positions on the surface, respectively. This optical module also includes a vertical adjuster placed in the optical paths of the optical beams and to control and adjust vertical positions of the optical beams on the surface, and a scanning control mechanism to synchronize the vertical adjuster to the polygon scanner to adjust vertical positions of the optical beams on the surface to spatially interlace one frame of a sequential sets of simultaneous horizontal scanning lines on the surface produced by the polygon facets, respectively, one set per polygon facet, in one full rotation of the polygon scanner with a subsequent frame of a sequential sets of simultaneous horizontal scanning lines on the surface produced by the polygon facets, respectively, one set per polygon facet, in an immediate subsequent full rotation of the polygon scanner.

In yet another aspect, a method for scanning optical beams in a scanning beam system includes producing a plurality of optical beams modulated to carry images to scan over a surface to produce the images on the surface and using a polygon scanner in optical paths of the optical beams to scan the optical beams horizontally on the surface. The polygon scanner includes a rotation axis around which the polygon scanner rotates and polygon facets that are sized to simultaneously receive the optical beams and reflective to light of the optical beams. The polygon facets are tilted with respect to the rotation axis at different tilt angles, respectively, to scan the optical beams horizontally at different vertical positions on the surface, respectively, to produce one frame of a sequential sets of simultaneous horizontal scanning lines on the surface produced by the polygon facets, respectively, one set per polygon facet, in one full rotation of the polygon scanner. This method includes holding a vertical position of each optical beam on at a fixed position when each optical beam is being horizontally scanned on the surface and the light of each optical beam is projected onto the surface, without scanning each optical beam along the vertical direction.

These and other examples and implementations are described in detail in the drawings, the detailed description, and the claims.

BRIEF DESCRIPTION OF THE DRAWINGS

FIG. 11 shows a stacking operation of the vertical adjuster based on horizontal scanning and vertical stepping of the two-dimensional polygon scanner in a beam scanning system.

DETAILED DESCRIPTION

Figure 1A:
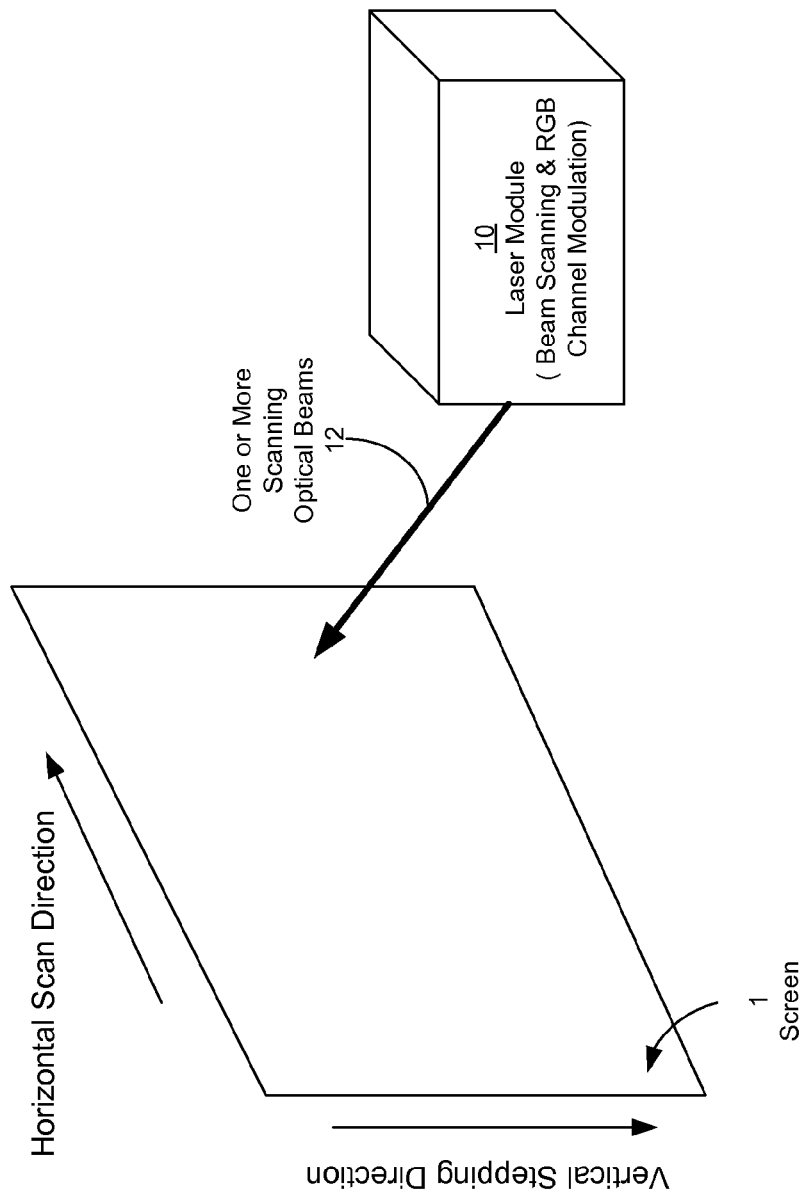
FIG. 1A shows a scanning beam display system based on a combination of a two-dimensional polygon scanner with differently tiled facets and a vertical adjuster for a display screen that can either a passive screen or a light-emitting screen under optical excitation.

Various display systems based on scanning one or more optical beams on a screen use a combination of a horizontal polygon scanner and a vertical scanner to produce a desired raster scanning pattern on the screen to produce images. For example, in some implementations, the horizontal polygon scanner can be used to scan an optical beam only horizontally without performing vertical scanning functions and the vertical scanner can be used to scan of the beam on the screen without performing any horizontal scanning. Such horizontal and vertical scans are usually synchronized to each other to perform the scanning simultaneously. Hence, as the polygon scanner scans the beam horizontally, the vertical scanner simultaneously scans the beam vertically. As a result, each scanning trace of the beam on the screen is a slanted line and is not horizontal. In this combination of simultaneous horizontal scanning and vertical scanning, the vertical scanner is designed to have a sufficient vertical angular scanning range to cover all desired vertical positions on the screen, an acceptable linear range for the vertical scanning, and a sufficiently short response time for desired refresh rate and retrace time of the raster scanning. In high definition display systems, such as 1080p HDTV systems, various technologies and designs for vertical scanners may be difficult to meet the scanning requirements due to the high scanning rates associated with high resolution nature of the display, limited space for accommodating the optical path from the vertical scanner to the screen, and other factors.

The examples and implementations of scanning beam systems for display and other applications in this patent application are based on a two-dimensional polygon scanner with different reflective polygon facets tilted at different tilt facet angles to use rotations of the polygon scanner to scan optical beams horizontally without simultaneous vertical scanning to produce horizontal scan lines on the screen and adjust vertical positions of the optical beams during a blanking time when there is no light projected onto the screen by using different facets to perform the horizontal scanning. A vertical adjuster can be used in combination with the two-dimensional polygon scanner to provide an additional vertical adjustment to the vertical positions of the beams during a blanking time when there is no light projected onto the screen to increase the number of horizontal lines on the screen. This vertical adjuster can include a reflector to reflect each beam and an actuator to control the orientation of the reflector to adjust the vertical position of a beam on the screen. The vertical adjuster is operated to hold the vertical position of a beam at a fixed vertical position on the screen when the beam is being horizontally scanned on the screen. Hence, the vertical adjuster in such implementations does not perform the conventional vertical scanning due to the operation of the two-dimensional polygon scanner. Therefore, the present use of the two-dimensional polygon scanner can lessen the technical performance parameters for the vertical adjuster in comparison with a vertical scanner and to allow a variety of beam deflection devices with adjust actuators to be used as the vertical adjuster, such as various 1-dimensional beam scanners, reflectors coupled with step actuators and others, to be used in scanning display systems based on the two-dimensional polygon scanner described in this patent application. As a specific example, a beam deflector having a reflective mirror and a sweeping or step galvanometer actuator engaged to the mirror may be used to implement the vertical adjuster.

FIG. 1A shows illustrates an example of a scanning beam display system based on a two-dimensional polygon scanner with different reflective polygon facets tilted at different tilt facet angles to produce parallel horizontal lines at different vertical positions on the screen and a vertical adjuster to adjust vertical positions of parallel horizontal lines in one group to relative to vertical positions of parallel horizontal lines in another group produced in time subsequent to the prior group on the screen. The vertical adjuster can be controlled to produce an interlaced scanning pattern formed by the two or more groups of the parallel horizontal lines or other scanning patterns. The vertical and horizontal directions are used in this patent application to represent two orthogonal directions in general and are not intended to represent any specific directions such as the vertical direction with respect to the earth's gravity. This system includes a screen 1 on which images are displayed and a laser module 10 that produces and scans one or more scanning optical beams 12 onto the screen 1. An optical beam 12 is modulated to carry images, a sequence of laser pulses that carry image data. The laser module 10 scans the one or more optical beams 12 in a raster scan pattern to display the images on the screen 1.

The two-dimensional polygon scanner and the vertical adjuster are included as part of the scanning module inside the laser module 10. One or more lasers are included in the laser module to produce the one or more optical beams 12. A scanning control module is provided to control the polygon scanner and the vertical adjuster. The polygon scanner is positioned in optical paths of the one or more optical beams 12 and includes a rotation axis along the vertical direction and the polygon scanner rotates around this rotation axis to scan the optical beams 12 horizontally on the screen 1 along the horizontal scanning direction as shown. The polygon is designed to have multiple polygon facets that are sized to simultaneously receive the one or more optical beams 12 directed from the one or more lasers. The polygon facets are reflective to light of the optical beams 12 and tilted with respect to the rotation axis at different tilt angles, respectively, to scan the optical beams horizontally at different vertical positions on the screen, respectively. The vertical adjuster is placed in the optical paths of the optical beams 12 to adjust vertical positions of the optical beams on the screen.

In operation, the polygon scanner rotates to scan the scanning beams. Each polygon facet receives, reflects and scans the one or more beams 12 horizontally on the screen 1. The immediate next polygon facet is tilted at a different tilt angle and thus receives, reflects and scans the same one or more beams 12 horizontally at different vertical positions on the screen 1. In systems with multiple optical beams 12, the different optical beams from one polygon facet are directed to different vertical positions on the screen 1. As different polygon facets sequentially take turns to perform the horizontal scanning of the one or more beams 12 as the polygon scanner rotates, the vertical positions of the one or more beams 12 on the screen 1 are stepped vertically at different positions along the vertical stepping direction without a conventional vertical scanner in other scanning systems. During the time when a facet scans the one or more beams 12 on the screen 1, the vertical adjuster is operated at a fixed orientation so that each beam 12 is being scanned only along the horizontal direction without a simultaneous vertical scanning.

Figure 1B:
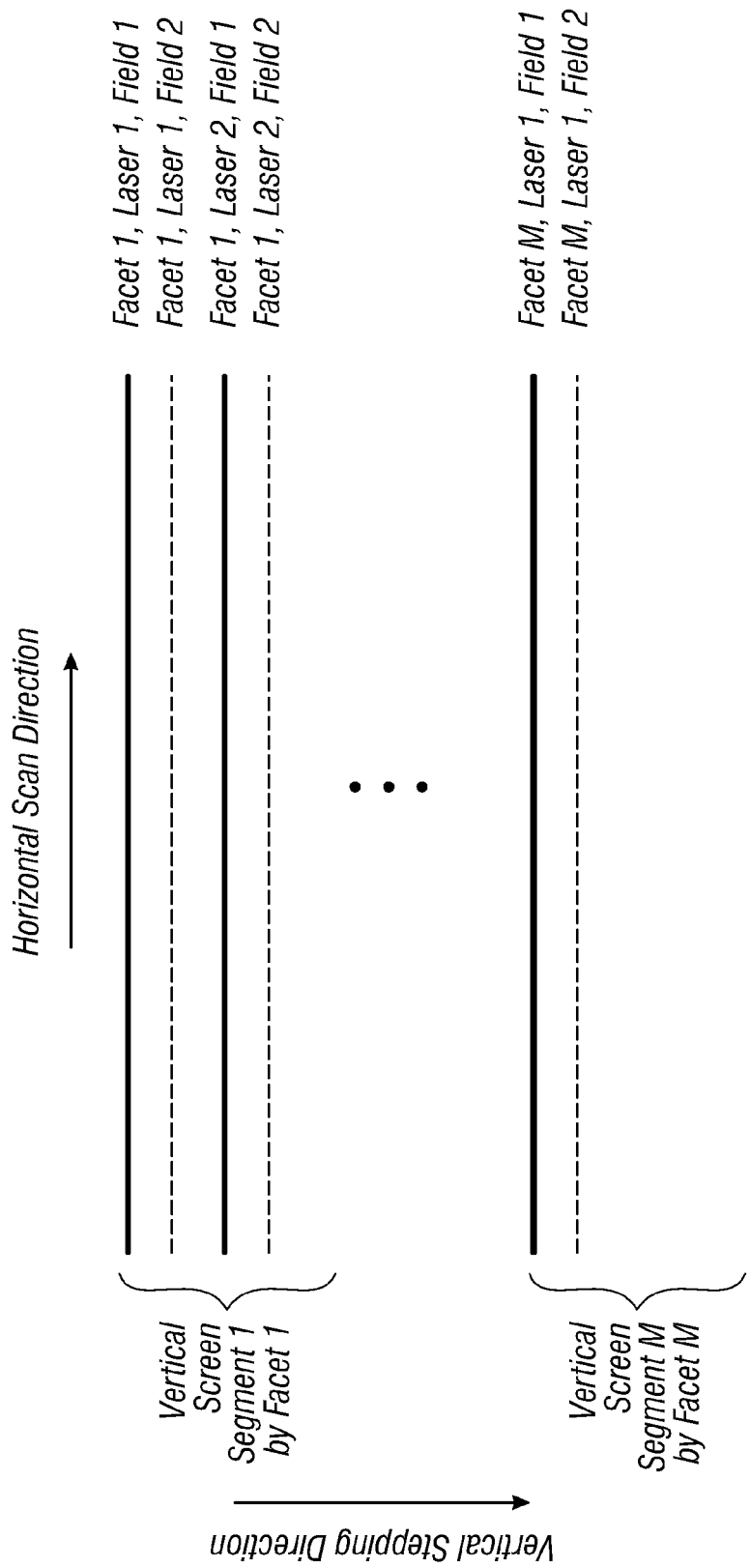
FIG. 1B illustrates an example of the scanning by the two-dimensional polygon scanner and the vertical adjuster in FIG. 1 to interlace two fields, field 1 and field 2, into a full frame.

FIG. 1B illustrates one example for interlaced raster scanning for the 2D polygon scanner and the vertical adjuster in FIG. 1A. Assume there are M facets in the polygon and N optical beams 12. The tilt facet angles of the polygon facets can be designed to vertically divide the screen into M vertical segments to project N parallel horizontal scan lines in each vertical segment. In some implementations, the line spacing between two adjacent lines of the N lines can be set to allow for at least one horizontal scan line and this configuration can be used to support interlaced scanning operations. As the polygon rotates, different facets direct and scan different vertical segments at different times, one at a time. Hence, scanning by different polygon facets in one full rotation of the polygon scanner produces a frame or field of M×N horizontal scanning lines that are made of M sequential sets of N simultaneous horizontal lines. This operation provides both horizontal scanning by each facet and vertical stepping by sequentially changing the polygon facets. Therefore, in one full rotation, the polygon scanner produces one frame of a sequential sets of simultaneous horizontal scanning lines on the screen produced by the polygon facets, respectively and each polygon facet produces one set of simultaneous and horizontal scanning lines.

Notably, during each full rotation, the vertical adjuster is controlled at a fixed orientation. After completion of one full rotation of the polygon and before the next full rotation of the polygon, the vertical adjuster is operated to adjust its orientation to change vertical positions of the optical beams 12 on the screen 1 to spatially interlace horizontal scanning lines in one frame produced in one full rotation of the polygon scanner with horizontal scanning lines of a subsequent frame produced in an immediate subsequent full rotation of the polygon scanner. The vertical adjuster and the polygon scanner are synchronized to each other to perform the above interlaced raster scanning. In the example in FIG. 1B, each full frame image is formed by two frames or fields, Field 1 and Field 2, that are spatially interlaced and the line spacing between two adjacent lines produced by each facet is one horizontal scan line to facilitate the interface operation. Hence, the vertical adjuster in this example, is operated to operate at two orientations, one orientation for the Field 1 and another for the Field 2, respectively. The rate for the vertical adjustment of the beam position is only 2 per full frame.

In the system in FIG. 1A, the screen 1 and the laser module 10 can be implemented in various configurations. For example, the screen 1 can be a passive screen that does not emit visible light and renders images by reflecting, diffusing or scattering visible light of the one or more optical beams 12 that carry images and the one or more optical beams 12 are visible beams, e.g., red, green and blue beams.

For another example, the screen 1 in FIG. 1A can be a screen that absorbs light of the one or more optical beams 12 which may be UV or violet light and emit visible light that renders the images carried by the one or more optical beams. Such a system uses a screen with light-emitting materials, such as phosphor and fluorescent materials, to emit light under optical excitation to produce images. Various examples of screen designs with light-emitting or fluorescent materials are described. Screens with phosphor materials under excitation of one or more scanning excitation laser beams are described in detail and are used as specific implementation examples of optically excited fluorescent materials in various system and device examples in this application.

Figure 1C:
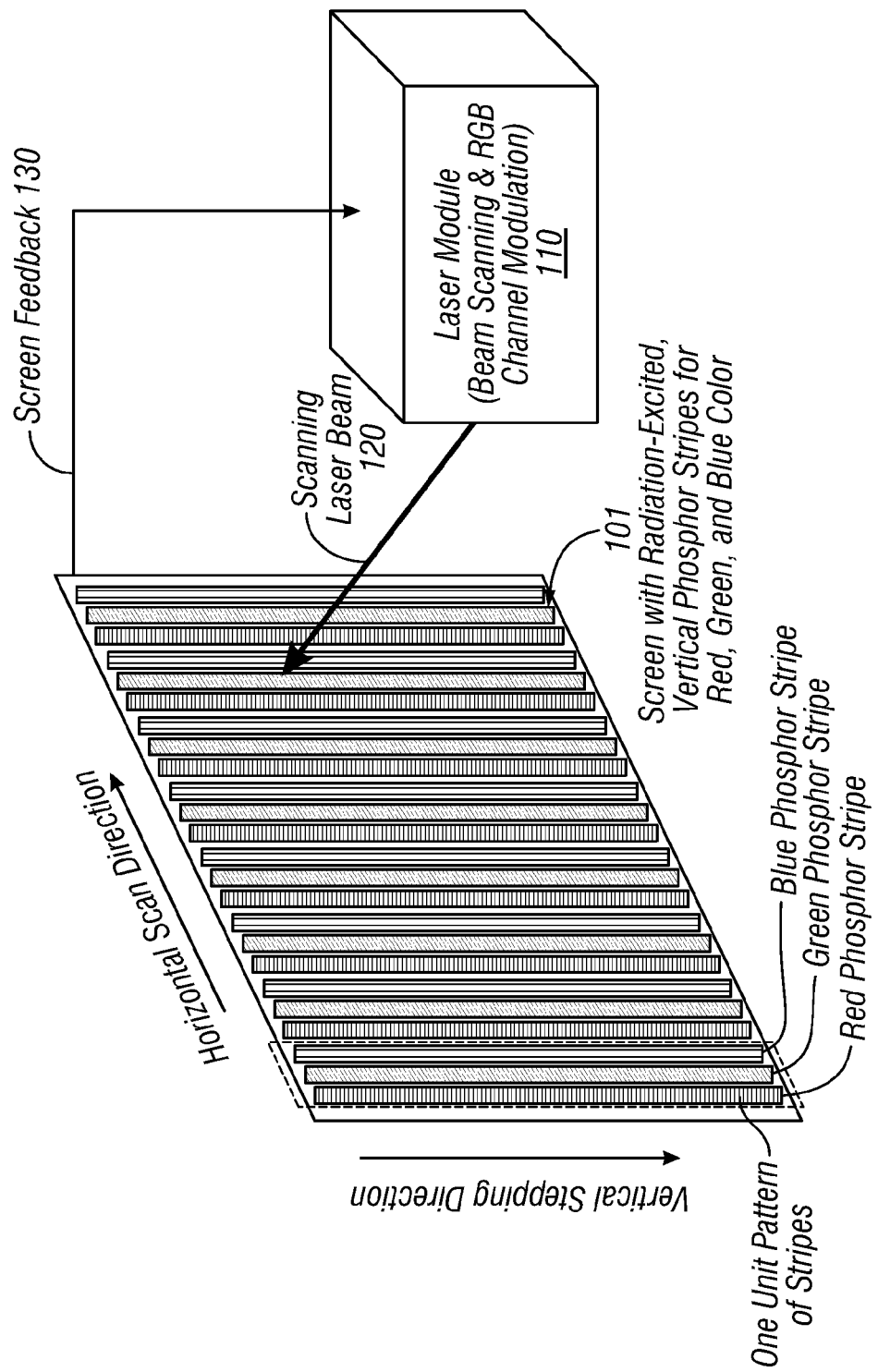
FIG. 1C shows an example scanning laser display system having a fluorescent screen made of laser-excitable fluorescent materials (e.g., phosphors) emitting colored lights under excitation of a scanning laser beam that carries the image information to be displayed.

FIG. 1C illustrates an example of a laser-based display system using a light-emitting screen 101 under optical excitation of scanning beams 120. In one implementation, for example, three different color phosphors that are optically excitable by the laser beam to respectively produce light in red, green, and blue colors suitable for forming color images may be formed on the screen as pixel dots or repetitive red, green and blue phosphor stripes in parallel. Various examples described in this application use screens with parallel color phosphor stripes for emitting light in red, green, and blue to illustrate various features of the laser-based displays.

Phosphor materials are one type of light-emitting materials. Various described systems, devices and features in the examples that use phosphors as the fluorescent materials are applicable to displays with screens made of other optically excitable, light-emitting, non-phosphor fluorescent materials. For example, quantum dot materials emit light under proper optical excitation and thus can be used as the fluorescent materials for systems and devices in this application.

The system in FIG. 1C and other examples of scanning beam display systems based on light-emitting screens use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

In FIG. 1C, the screen 101 is designed to have color phosphor stripes. Alternatively, color phosphor dots may also be used to define the image pixels on the screen. The system includes a laser module 110 to produce and project at least one scanning laser beam 120 onto a screen 101. The screen 101 has parallel color phosphor stripes in the vertical direction and two adjacent phosphor stripes are made of different phosphor materials that emit light in different colors. In the illustrated example, red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1C as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 can include one or more lasers such as UV diode lasers to produce the beam 120, a beam scanning mechanism to scan the beam 120 horizontally from left to right and vertically from top to down to render one image frame at a time on the screen 101, and a signal modulation mechanism to modulate the beam 120 to carry the information for image channels for red, green and blue colors. Such display systems may be configured as rear scanning systems where the viewer and the laser module 110 are on the opposite sides of the screen 101. Alternatively, such display systems may be configured as front scanning systems where the viewer and laser module 110 are on the same side of the screen 101.

Figure 2A:
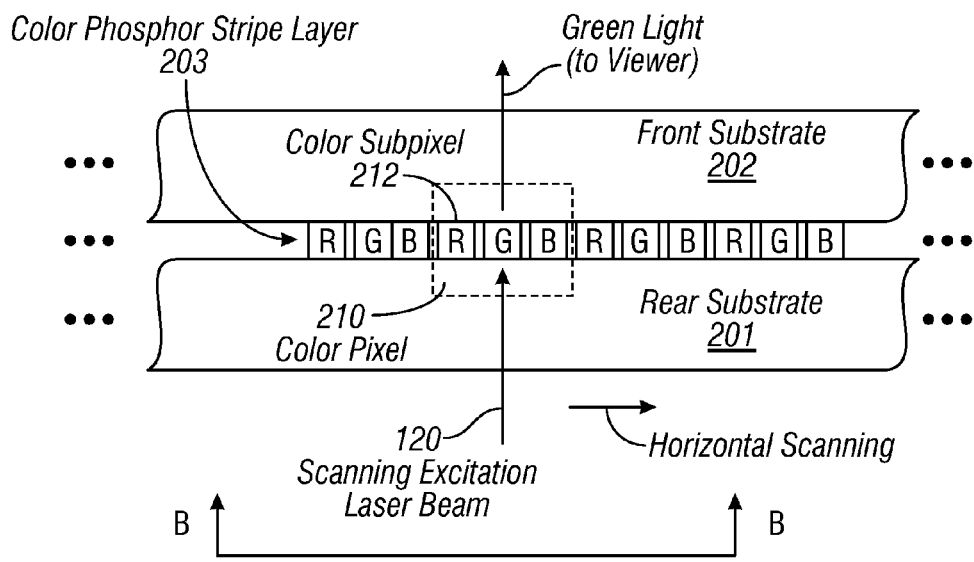
FIGS. 2A and 2B show one example screen structure and the structure of color pixels on the screen in FIG. 1C.

FIG. 2A shows an exemplary design of the screen 101 in FIG. 1C. The screen 101 may include a rear substrate 201 which is transparent to the scanning laser beam 120 and faces the laser module 110 to receive the scanning laser beam 120. A second front substrate 202, is fixed relative to the rear substrate 201 and faces the viewer in a rear scanning configuration. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic thin or thick panels with various optical functions. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 2B:
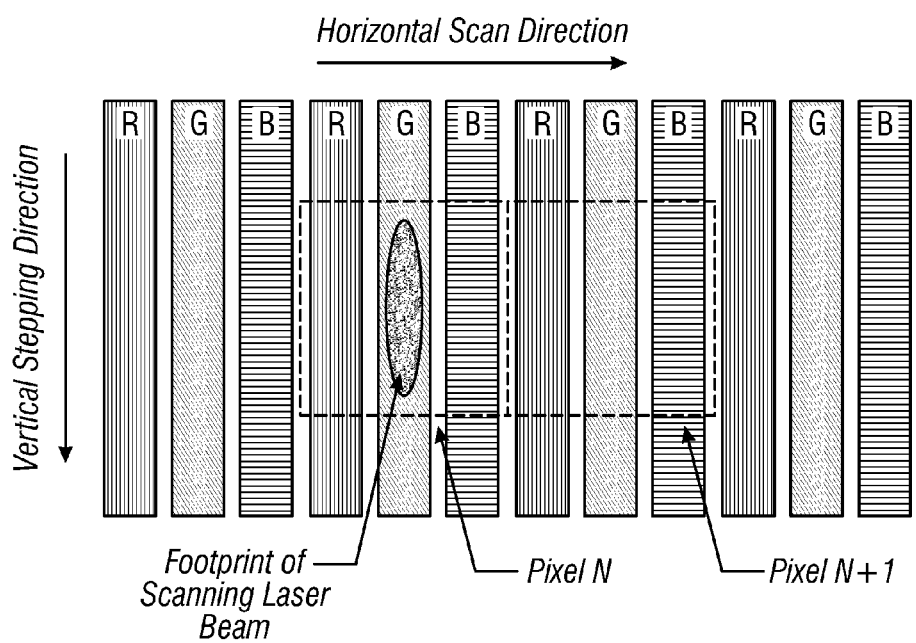

In FIG. 2A, the scanning laser beam 120 is directed at the green phosphor stripe within a pixel to produce green light for that pixel. FIG. 2B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Hence, the laser beam 120, which is modulated to carry optical pulses with image data, needs to be aligned with respect to proper color pixels on the screen 101. The laser beam 120 is scanned spatially across the screen 101 to hit different color pixels at different times. Accordingly, the modulated beam 120 carries the image signals for the red, green and blue colors for each pixel at different times and for different pixels at different times. Hence, the beams 120 are coded with image information for different pixels at different times. The beam scanning thus maps the timely coded image signals in the beams 120 onto the spatial pixels on the screen 101.

A scanning display system described in this patent application can be calibrated during the manufacture process so that the laser beam on-off timing and position of the laser beam relative to the fluorescent stripes in the screen 101 are known and are controlled within a permissible tolerance margin in order for the system to properly operate with specified image quality. However, the screen 101 and components in the laser module 101 of the system can change over time due to various factors, such as scanning device jitter, changes in temperature or humidity, changes in orientation of the system relative to gravity, settling due to vibration, aging and others. Such changes can affect the positioning of the laser source relative to the screen 101 over time and thus the factory-set alignment can be altered due to such changes. Notably, such changes can produce visible and, often undesirable, effects on the displayed images. For example, a laser pulse in the scanning excitation beam 120 may hit a subpixel that is adjacent to an intended target subpixel for that laser pulse due to a misalignment of the scanning beam 120 relative to the screen along the horizontal scanning direction. When this occurs, the coloring of the displayed image is changed from the intended coloring of the image. Hence, a red flag in the intended image may be displayed as a green flag on the screen. For another example, a laser pulse in the scanning excitation beam 120 may hit both the intended target subpixel and an adjacent subpixel next to the intended target subpixel due to a misalignment of the scanning beam 120 relative to the screen along the horizontal scanning direction. When this occurs, the coloring of the displayed image is changed from the intended coloring of the image and the image resolution deteriorates. The visible effects of these changes can increase as the screen display resolution increases because a smaller pixel means a smaller tolerance for a change in position. In addition, as the size of the screen increases, the effect of a change that can affect the alignment can be more pronounced because a large moment arm associated with a large screen means that an angular error can lead to a large position error on the screen. For example, if the laser beam position on the screen for a known beam angle changes over time, the result is a color shift in the image. This effect can be noticeable and thus undesirable to the viewer.

A feedback control alignment mechanism can be provided in the system in FIG. 1C to maintain proper alignment of the scanning beam 120 on the desired sub-pixel to achieved desired image quality. The screen 101 is used to provide a screen feedback signal 130 to indicate the alignment status of the beam 120. When the alignment has an error, the control module 110 responds to the error in the screen feedback to control the scanning beam 120 to compensate for the error. Such feedback control can include reference marks on the screen 101, both in the fluorescent area and in one or more peripheral area outside the fluorescent area, to provide feedback light that is caused by the excitation beam 120 and represents the position and other properties of the scanning beam on the screen 101. The feedback light can be measured by using one or more optical servo sensors to produce a feedback servo signal. A servo control in the laser module 110 processes this feedback servo signal to extract the information on the beam positioning and other properties of the beam on the screen and, in response, adjust the direction and other properties of the scanning beam 120 to ensure the proper operation of the display system.

For example, a feedback servo control system can be provided to use peripheral servo reference marks positioned outside the display area unobservable by the viewer to provide control over various beam properties, such as the horizontal positioning along the horizontal scanning direction perpendicular to the fluorescent stripes, the vertical positioning along the longitudinal direction of the fluorescent stripes, the beam focusing on the screen for control the image sharpness, and the beam power on the screen for control the image brightness. For another example, a screen calibration procedure can be performed at the startup of the display system to measure the beam position information as a calibration map so having the exact positions of sub-pixels on the screen in the time domain. This calibration map is then used by the laser module 110 to control the timing and positioning of the scanning beam 120 to achieve the desired color purity. For yet another example, a dynamic servo control system can be provided to regularly update the calibration map during the normal operation of the display system by using servo reference marks in the fluorescent area of the screen to provide the feedback light without affecting the viewing experience of a viewer.

PCT Application No. PCT/US2007/004004 entitled "Servo-Assisted Scanning Beam Display Systems Using Fluorescent Screens" and filed on Feb. 15, 2007 (PCT Publication No. WO 2007/095329) describes examples of feedback controls for scanning beam systems suitable for use with 3D systems described in this application and is incorporated by reference as part of the specification of this application.

Figure 3:
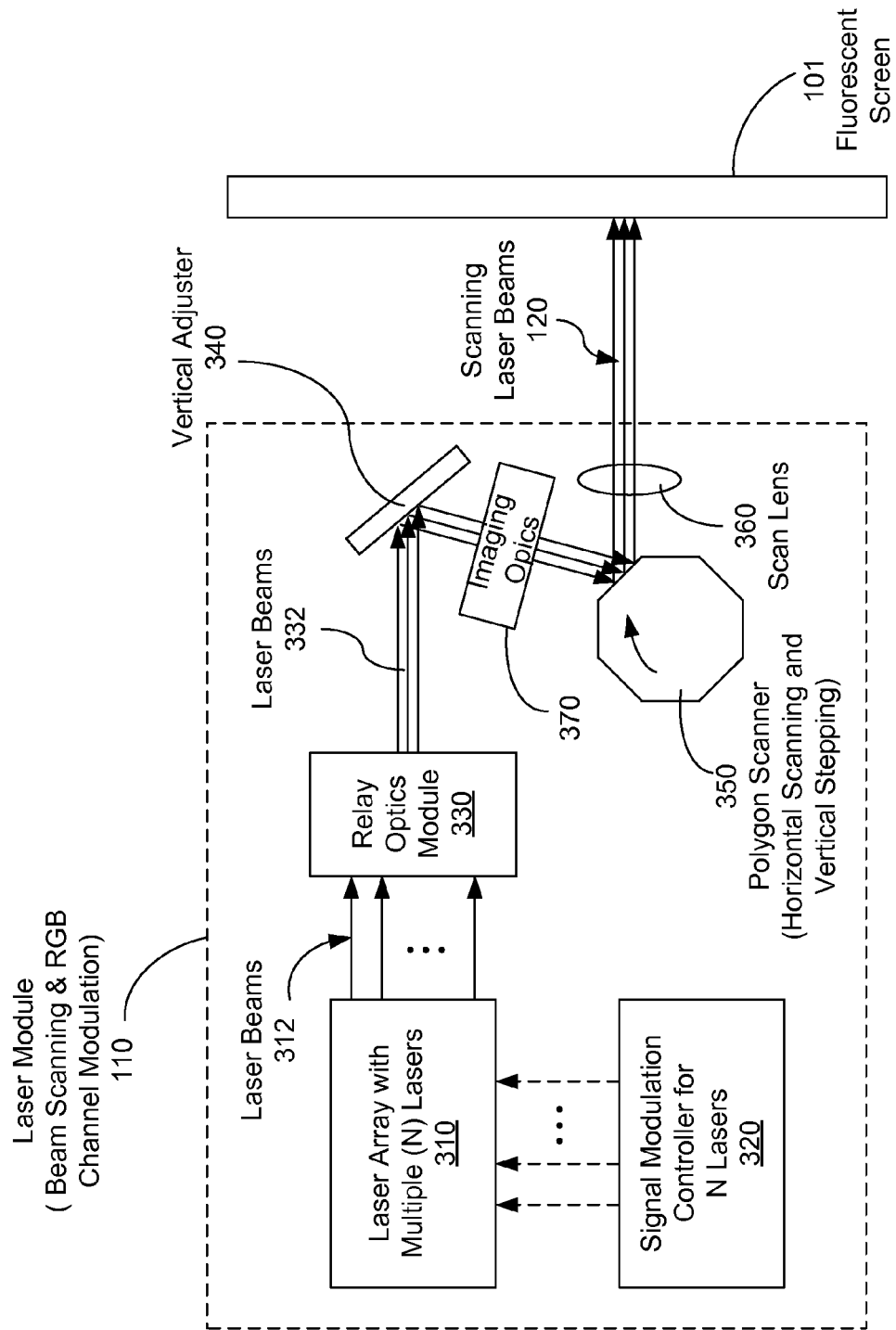
FIG. 3 shows an example implementation of the laser module in FIG. 1C having multiple lasers that direct multiple laser beams on the screen.

Referring now to FIG. 3, an example implementation of the laser module 110 in FIG. 1C is illustrated. A laser array 310 with multiple lasers is used to generate multiple laser beams 312 to simultaneously scan the screen 101 for enhanced display brightness. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning in the system in FIG. 3 is achieved by using a vertical adjuster 340 such as a galvo mirror for the vertical scanning and a 2-dimensional multi-facet polygon scanner 350 with different facets tilted at different angles. A scan lens 360 can be used to project the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers. In the illustrated example, the laser beams are first directed to the galvo vertical adjuster 340 and then from the galvo vertical adjuster 340 to the polygon scanner 350 which scans the received laser beams as output scanning beams 120 onto the screen 101. A relay optics module 330 is placed in the optical path of the laser beams 312 to modify the spatial property of the laser beams 312 and to produce a closely packed bundle of beams 332 for scanning by the polygon scanner 350. The scanning beams 120 projected onto the screen 101 excite the phosphors and the optically excited phosphors emit colored light to display visible images.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 320. The beam scanning thus maps the time-domain coded image signals in the beams 120 onto the spatial pixels on the screen 101. For example, the modulated laser beams 120 can have each color pixel time equally divided into three sequential time slots for the three color subpixels for the three different color channels. The modulation of the beams 120 may use pulse modulation techniques to produce desired grey scales in each color, a proper color combination in each pixel, and desired image brightness.

In one implementation, the optical relay module 330 can be an afocal device and includes a first lens having a first focal length to receive and focus the laser beams from the lasers; a second lens having a second focal length shorter than the first focal length and spaced from the first lens by the first focal length to focus the laser beams from the first lens; and a third lens having a third focal length longer than the second focal length and spaced from the second lens by the third focal length to focus and direct the laser beams from the second lens to the scanning module. Examples for the afocal optical relay module 330 are described in PCT application No. CT/US2006/041584 entitled "Optical Designs for Scanning Beam Display Systems Using Fluorescent Screens" and filed on Oct. 25, 2006 (PCT publication No. WO 2007/050662) and U.S. patent application Ser. No. 11/510,495 entitled "Optical Designs for Scanning Beam Display Systems Using Fluorescent Screens" and filed on Aug. 24, 2006 (U.S. publication No. US 2007-0206258 A1), which are incorporated by reference as part of the specification of this application.

In some implementations, an imaging module 370 can be placed in the optical path between the vertical adjuster 340 and the polygon to image the surface of the reflective surface of the vertical adjuster 340 onto a polygon facet that currently reflects the beams to the screen 101. This imaging effectively makes the vertical adjuster 340 coincident with the currently reflecting polygon facet which, in turn, is coincident with the entrance pupil of the scan lens 360. Therefore, the entrance pupil of the scan lens 360 is the pivot point for the scanning beams directed to the scan lens 360. The imaging module 370 can be in various optical configurations and may include, for example, two lenses in a 4f imaging configuration with a magnification of 1.

Figure 4A:
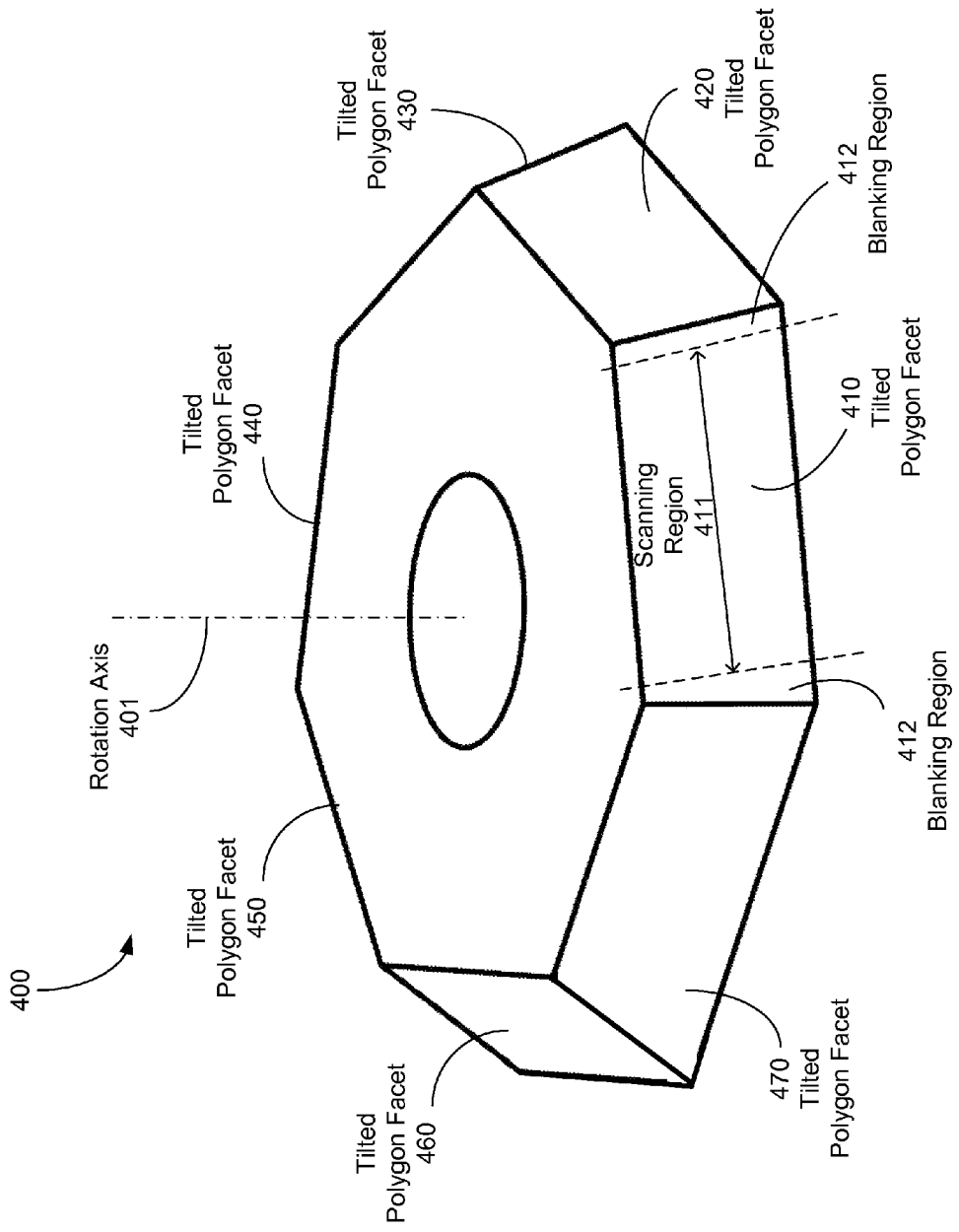
FIG. 4A shows an example of a two-dimensional polygon scanner with identical polygon facets with different tiled facet angles.

FIG. 4A shows an example of a two-dimensional polygon scanner 400 for a scanning beam display system, such as the systems in FIGS. 1A, 1C and 3. The polygon scanner 400 has a rotation axis represented by the line 401 along the vertical direction and has multiple reflective polygon facets (e.g., 410, 420, 430, 440, 450, 460 and 470) that are tilted at different tilt facet angles with respect to the rotation axis 401.

Figure 4B:
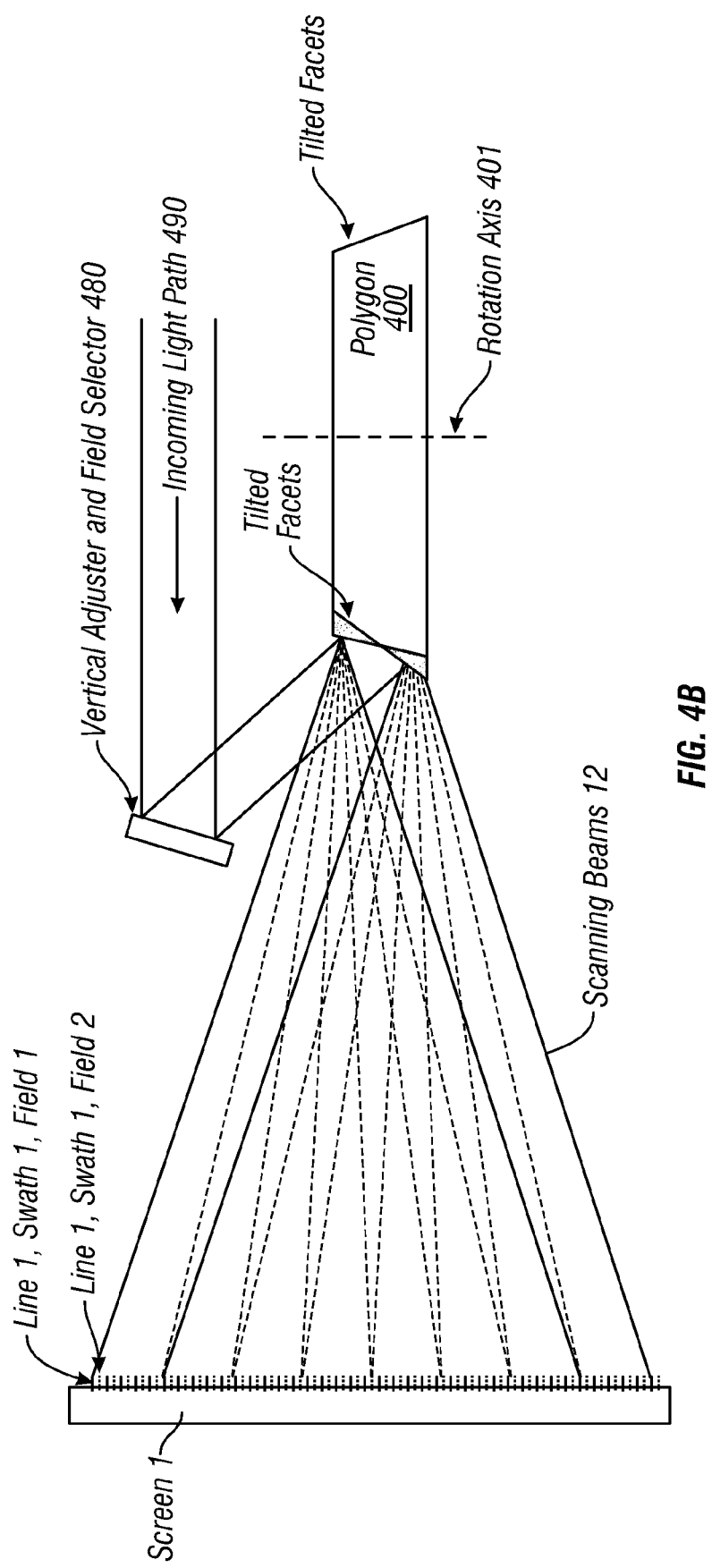
FIG. 4B illustrates operation of a two-dimensional polygon scanner.

FIG. 4B shows the vertical stepping by different polygon facets of the polygon scanner 400 in FIG. 4A. A vertical adjuster 480 directs light 490 to the polygon scanner 400 that rotates around its vertical rotation axis 401. In operation, the polygon scanner 400 rotates at a constant speed around the vertical rotation axis 401 and the incident optical beam at a fixed incident direction from the vertical adjuster 480 is reflected by different facets at different angles in the vertical direction as the horizontal scanning beams 12 towards the screen 1.

In operation, the light of the scanning beams 12 is turned off in certain times to create blanking periods so that no light is projected onto the screen 1 in order to minimize undesired visual effects on the screen 1. For example, during the rotation of the polygon scanner 400, each beam incident to the polygon scanner 400 is turned off for a short period when the boundary between two adjacent facets scans through the incident beam to avoid a portion of the beam less than the whole beam is directed to the screen 1. Referring to FIG. 4A, the polygon facet 410 is marked to show a central scanning region 411 for reflecting and scanning a beam onto the screen and two blanking regions 412 and 413 on two sides of the central scanning region 411 that with a width less than a beam diameter from the divider of two adjacent facets. The light of each beam is turned off when the beam falls in a blanking region 412 or 413 with only a portion of the whole beam spot being on the facet 410. This blanking reduces unwanted scattered light on to the screen 1 and improve the image quality.

In addition to the above transition from one facet to the subsequent facet, the system also experiences a transition phase between the end of one full rotation of the polygon scanner 400 and the beginning of the subsequent full rotation of the polygon scanner 400. During scanning within one full rotation of the polygon for producing horizontal lines for one field of two interlaced fields for a full frame, the vertical adjuster is fixed at a given vertical position. The vertical adjuster changes its orientation to a different fixed orientation after completion of one full rotation and before the next full rotation. This transition requires another blanking time during which the light in each optical beam is turned off to reduce undesired visual effects on the screen.

Figure 5:
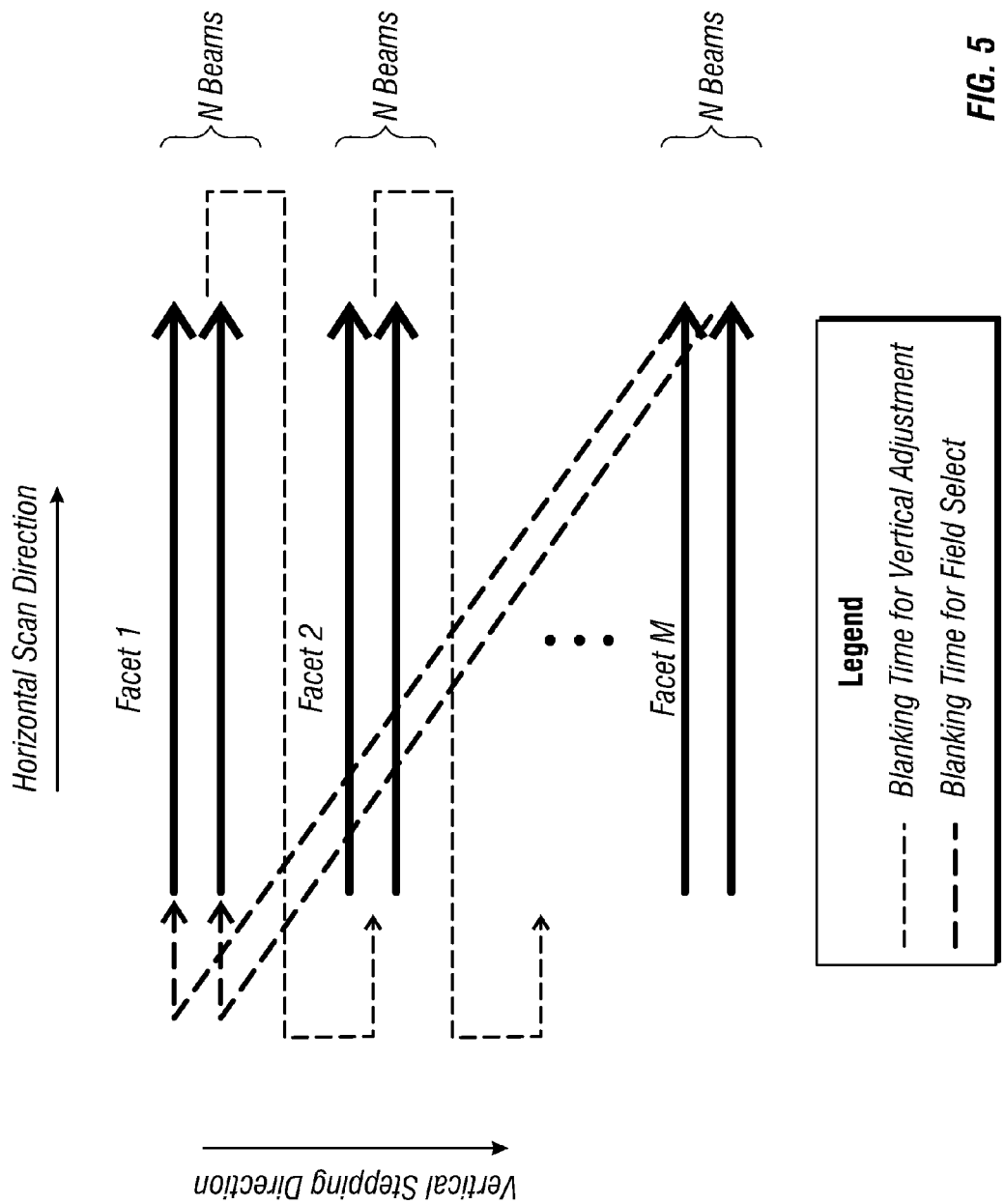
FIG. 5 illustrates an example of blanking periods in a 2-dimensional scanning pattern on the screen by using the polygon scanner in FIGS. 4A and 4B and a vertical adjuster that shifts the vertical positions of the beam incident to the polygon scanner.

FIG. 5 illustrates the parallel horizontal scan lines formed on a screen for the system in FIGS. 4A and 4B and shows the blanking periods when light to the screen is turned off. Two different types of blanking times are shown. The first type is the blanking time for the vertical stepping by the polygon when transitioning across the boundary regions of two adjacent facets during a horizontal scanning by the polygon scanner. The second type is the blanking time when the vertical adjuster adjusts its orientation to shift the vertical position of an image field with respect to a preceding imaging field to interlace the two image fields to form a full image.

The blanking time during transitioning between two adjacent facets and the blanking time during transitioning between two sequential full rotations can be implemented in various configurations. Referring to FIG. 4A, for example, one way for providing the blanking times is to design all polygon facets identical in size and shape and with a dimension along the horizontal scanning direction longer than the scanning region 411 to have blanking regions 412 and 413 at both ends of each facet. Under this design, the light of each beam is turned off when the beam is located in the blanking region 412 or 413. The blanking regions 412 and 413 are designed to be sufficiently long to accommodate for the desired blanking times for transitioning between adjacent facets and between two sequential full rotations of the polygon scanner 400.

As another example, the polygon facets can be made identical and one facet is designated as a blanking facet where the light of each beam is turned off during the time the beam falls on the blanking facet to facilitate the transition between two sequential full rotations of the polygon scanner 400.

Figure 6A:
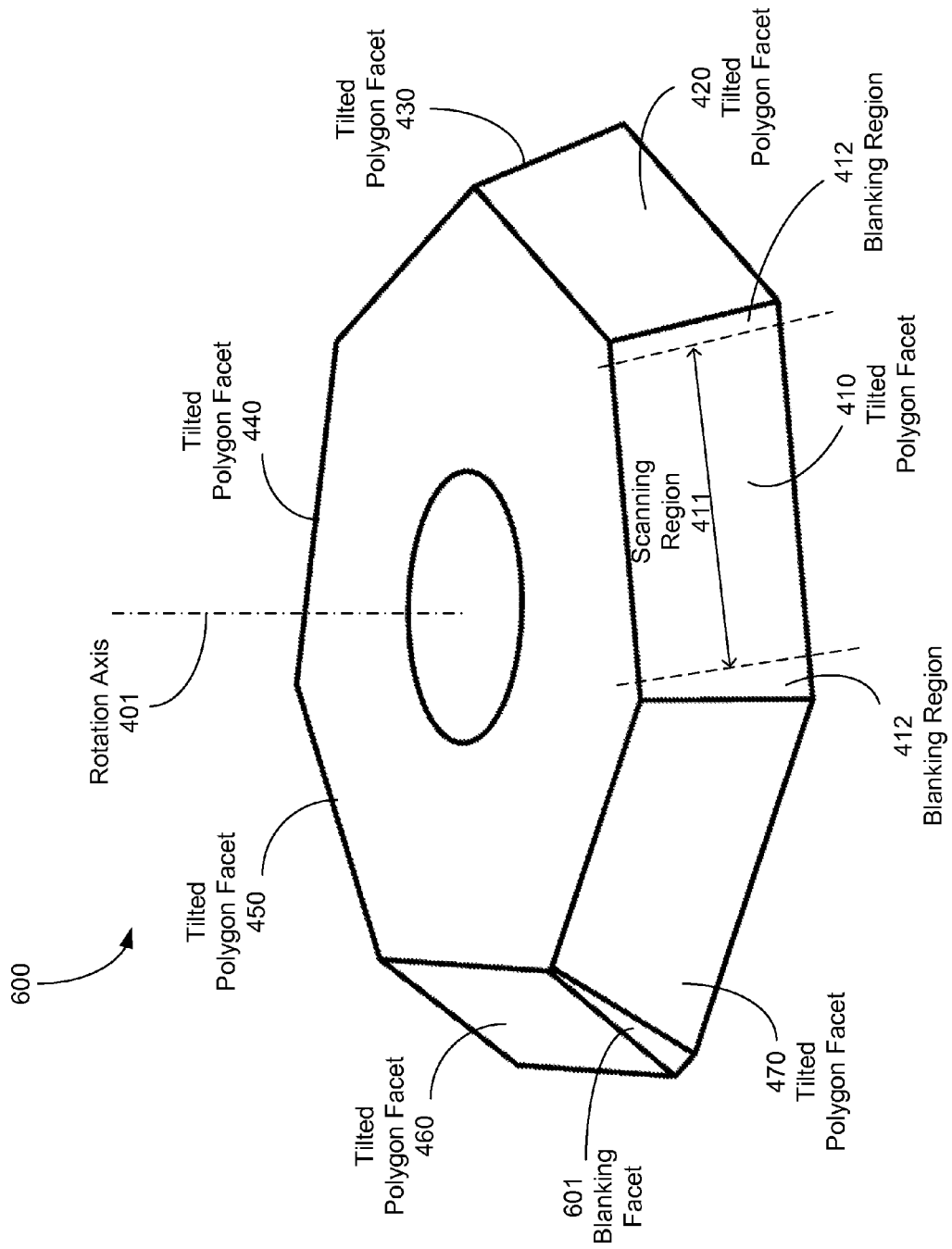
FIGS. 6A and 6B show additional examples of two-dimensional polygon scanners with a different facet designated for create a blanking time during the polygon scanning.

FIG. 6A shows another example of a polygon scanner 600 where a special "blanking" polygon facet 601 is provided and is configured to have a different size from regular polygon facets. In many applications, this blanking polygon facet 601 is made to be smaller than the regular polygon facets. In operation, the light of each beam is turned off during the time the beam falls on the blanking facet 601 to facilitate the transition between two sequential full rotations of the polygon scanner 600.

Figure 6B:
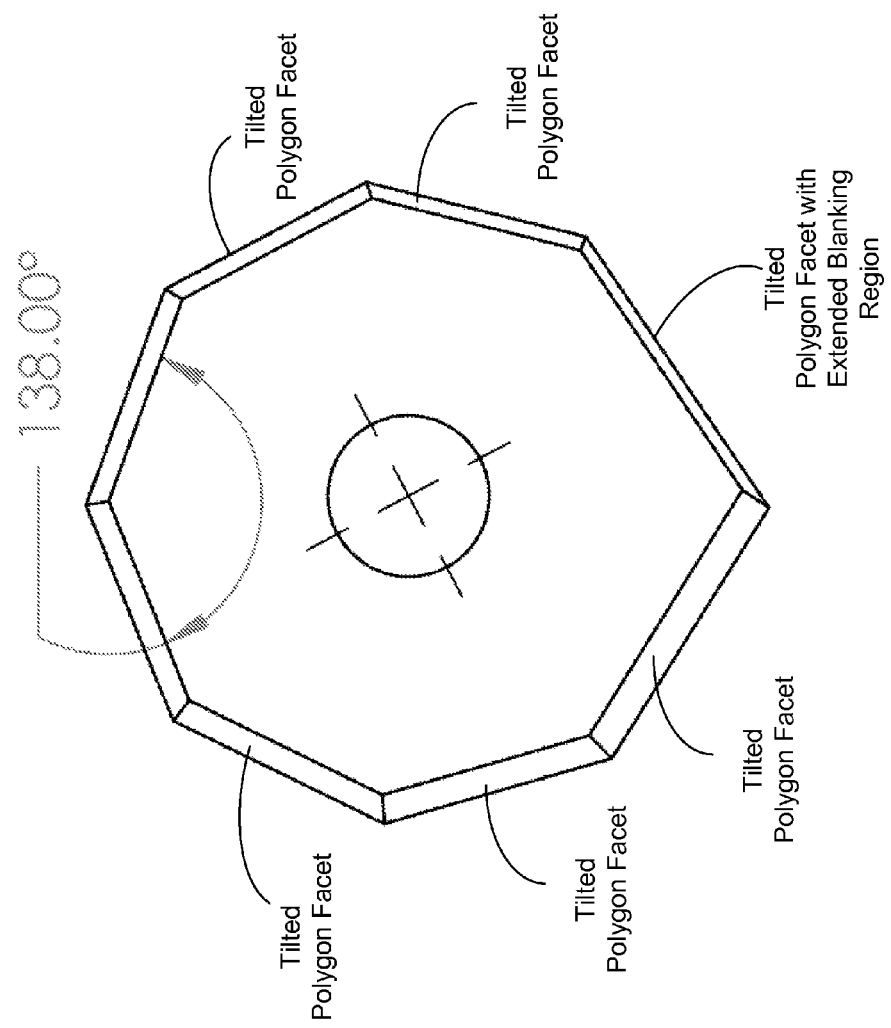

FIG. 6B shows yet another example of a polygon scanner where one facet is selected to have an extended region that is used to provide a special "blanking" region. The light of each beam is turned off during the time the beam falls on the blanking region of the polygon facet while the light is turned on when the beam is at other portion of the same polygon facet. This extended blanking region is to facilitate the transition between two sequential full rotations of the polygon scanner.

Referring back to the example in FIG. 3, the vertical adjuster 340 is positioned upstream from the polygon scanner 350 (which is know the two dimensional polygon scanner) to direct the optical beams from the relay optics module 330 to the polygon scanner 350 which in turn scans the beams in two dimension onto the screen 101. Under this optical train design, the optical path for each optical beam 120 is folded and the vertical adjuster can be located closer to the screen 101 than the polygon scanner 350 under various arrangements.

As an example, the two dimensional polygon scanner 350 and the vertical adjuster 340 can be placed at two locations that are horizontally at a center of the screen 101 and the vertical adjuster 340 is closer to the screen 101 than the polygon scanner 350 to direct the optical beams 120 to the polygon scanner 350 at an acute angle with respect to the rotation axis of the polygon scanner 350. The screen 101 may be tilted with respect to the he rotation axis of the polygon scanner 350 to reduce a symmetric image distortion on the screen 101. The vertical adjuster 340 can be located below or above the vertical position of the polygon scanner 350.

Figure 7A:
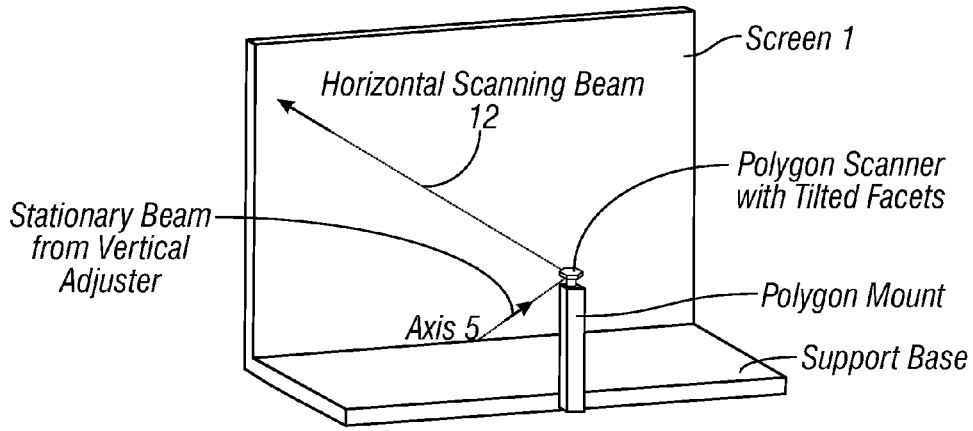
FIGS. 7A, 7B, 8A and 8B show examples of a scanning system with a two-dimensional polygon scanner in a bottom or upper feed arrangement.
Figure 7B:
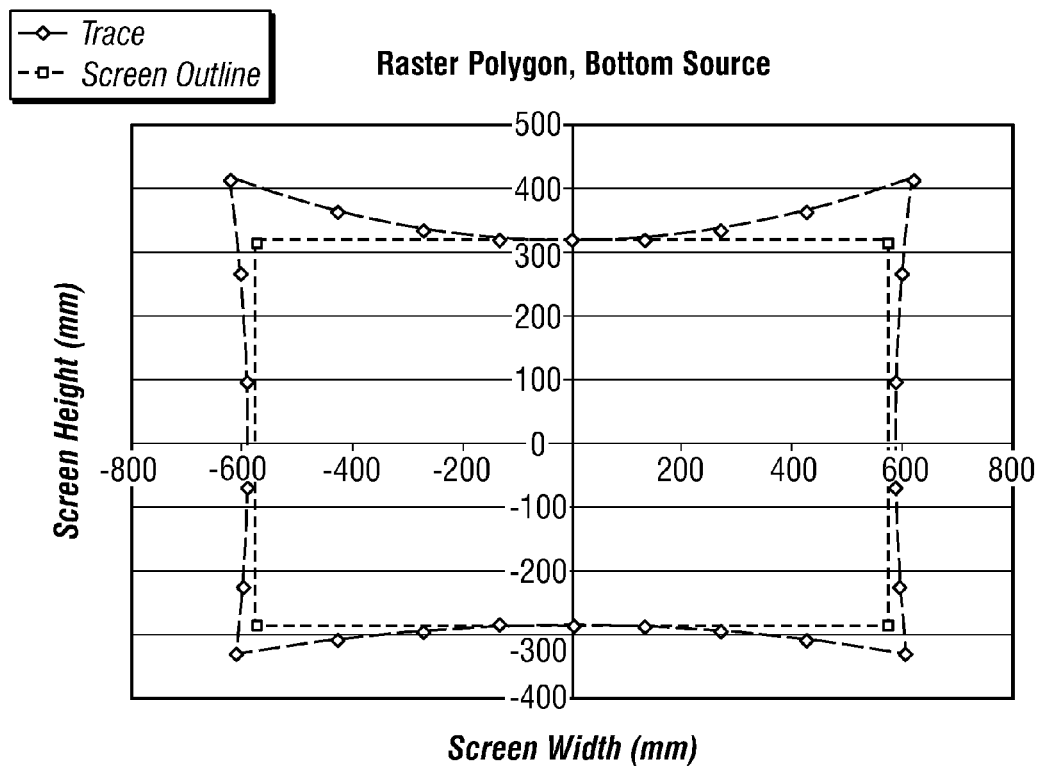

FIG. 7A shows an example where the vertical adjuster 340 is placed between the screen 101 and the polygon scanner 350 at a position below the polygon scanner 350 along the vertical direction with a 45-degree angle of incidence with respect to the vertical direction. FIG. 7B show the border trace of the projected image area on the screen which is distorted.

Figure 8A:
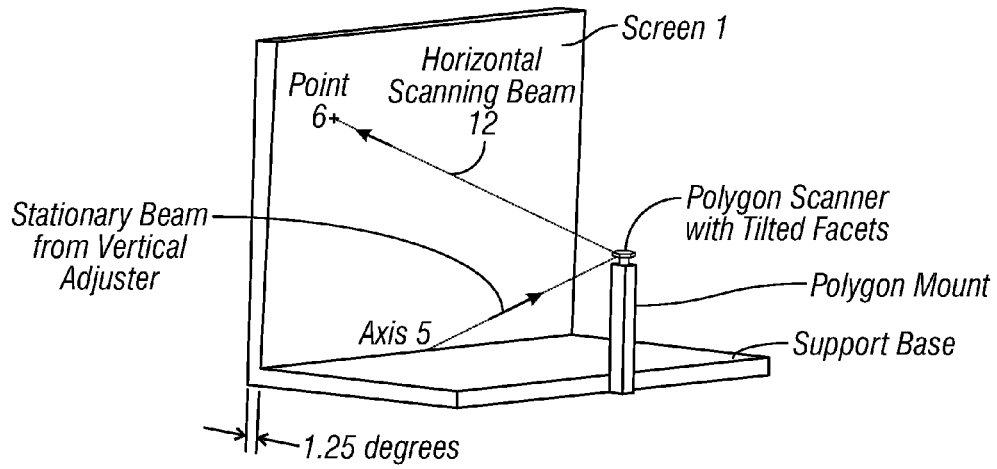
Figure 8B:
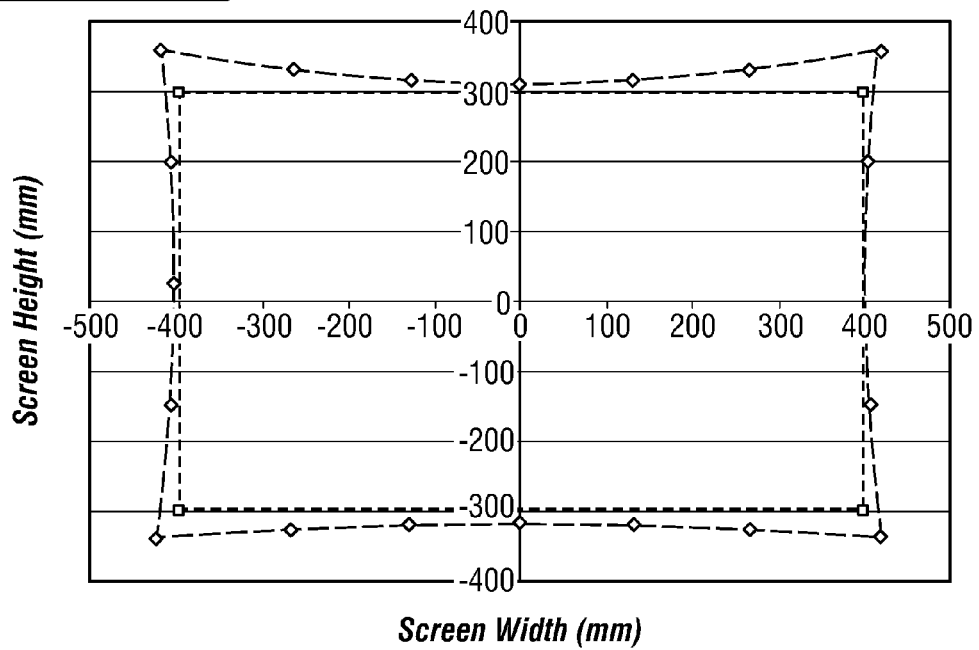

FIG. 8A shows tilting the screen in the system in FIG. 7A towards the polygon scanner by 1.25 degrees to reduce the image distortion. FIG. 8B shows the border trace of the projected image area on the tilted screen in which the distortions are reduced in within the screen area.

As another example, the polygon scanner 350 and the vertical adjuster 340 in FIG. 3 can be placed at two locations that are horizontally offset from each other and the vertical adjuster 340 is closer to the screen 101 than the polygon scanner 350 to direct the optical beams 120 to the polygon scanner 350. The vertical adjuster 340 and the polygon scanner 350 can be at the same height to direct the incident beam from the vertical adjuster 340 to the polygon scanner 350 at a side feed arrangement.

Figure 9A:
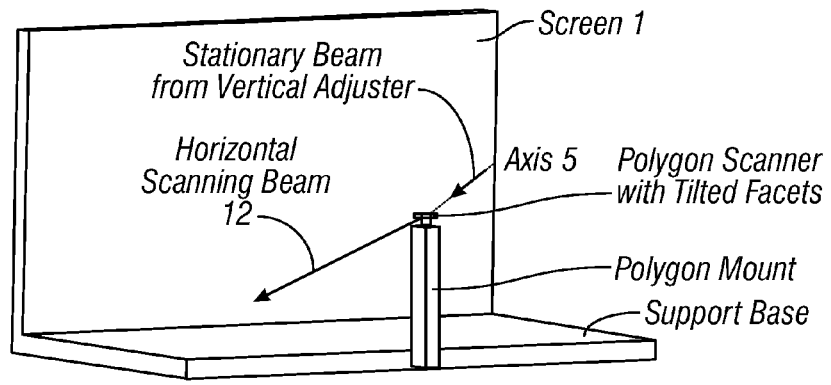
FIGS. 9A, 9B, 10A and 10B show examples of a scanning system with a two-dimensional polygon scanner in a side feed arrangement.
Figure 9B:
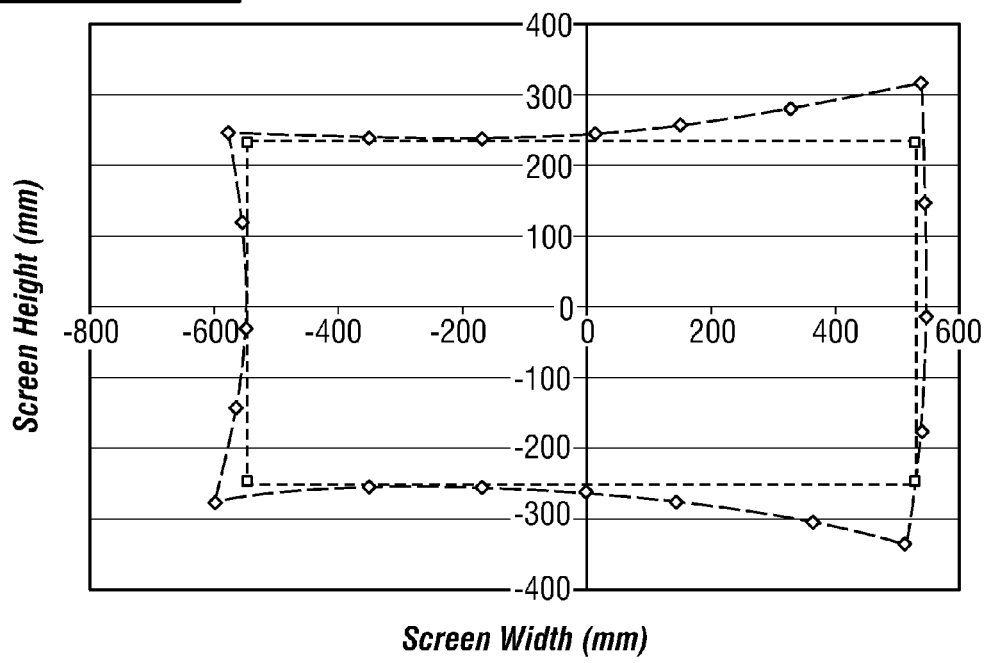
Figure 10A:
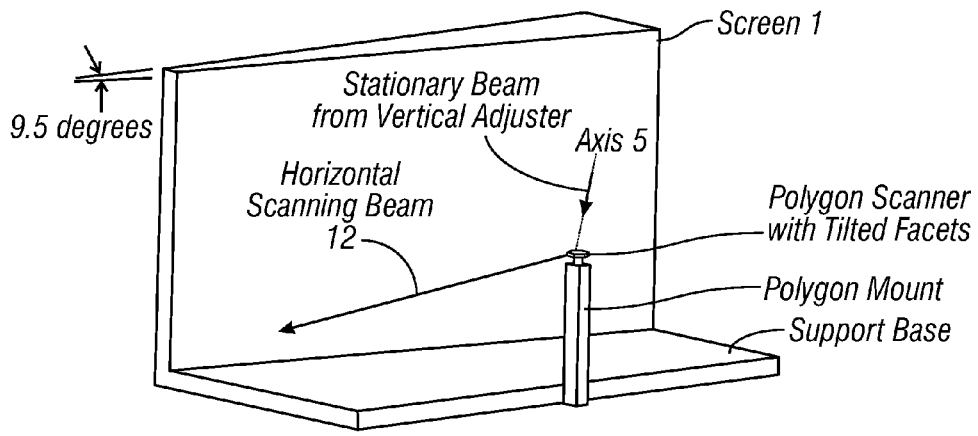
Figure 10B:
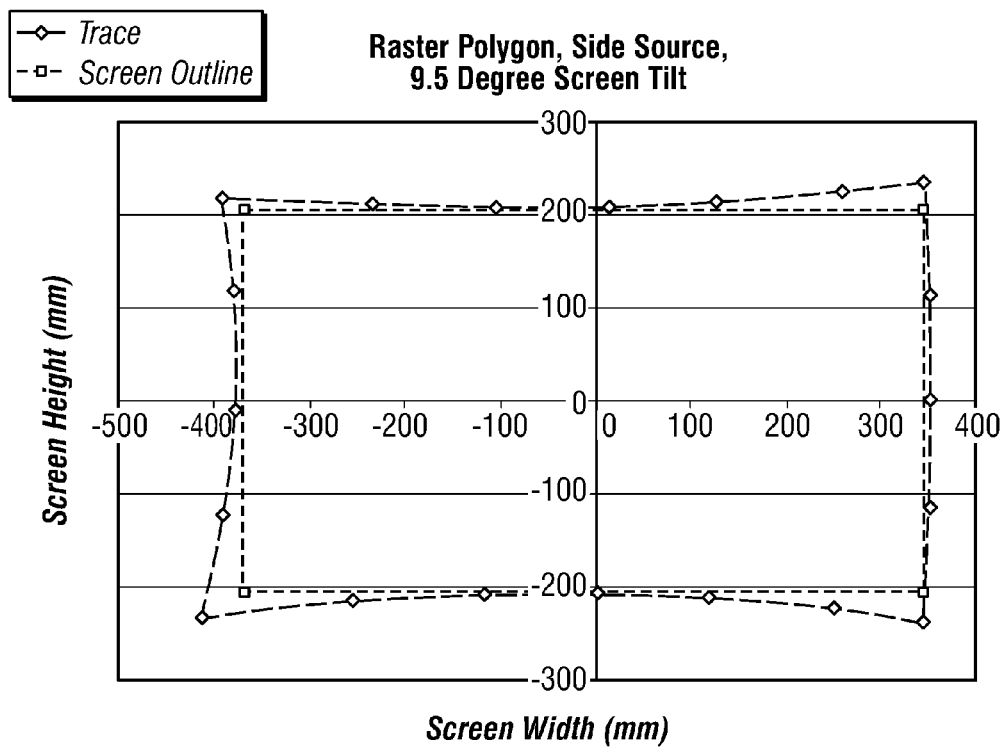

FIG. 9A shows an example of the side feed arrangement with a 45-degree angle of incidence from the vertical adjuster to the polygon scanner in the same horizontal plane. FIG. 9B shows the border trace of the projected image area on the screen in which the distortions are present. FIG. 10A shows tilting the screen around a vertical axis to counter the distortion caused by the side feed arrangement to reduce the distortions (FIG. 10B).

In the above examples, the vertical adjuster is used to hold the vertical position of each beam at a fixed vertical position on the screen during a horizontal scan by the polygon scanner and to adjust, during a blanking period, vertical positions of parallel horizontal lines in one group relative to vertical positions of parallel horizontal lines in another group produced subsequent to the prior group on the screen. This vertical adjustment can be used to interlace two or more image fields to form a full frame with the number of horizontal lines equal to the sum of the interlaced image fields.

Interlacing two image fields is illustrated in the example in FIG. 1B. The spacing between two adjacent lines on the screen produced by reflection of beams from a single polygon facet can be set to (P-1) where P is the number of fields to be interlaced and is an integer not less than 2. Hence, the spacing between the scanning lines on the screen formed by two adjacent laser beams reflected from a one polygon facet can be one horizontal line for interlacing two fields and two horizontal lines for interlacing three fields.

In addition, the vertical adjuster can be used to stack two or more different image fields along the vertical stepping direction to form a full image. The control unit is configured to control the vertical adjuster to scan the optical beams over a first surface segment at a first fixed position of the vertical adjuster in a full rotation of the polygon scanner and to scan the optical beams over a second surface segment that is vertically displaced from and does not overlap with the first surface segment when the vertical adjuster is at a second fixed position in a subsequent full rotation of the polygon scanner.

FIG. 11 shows an example of this operation mode of the vertical adjuster. In this example, one full rotation of the polygon produces Field 1 with N×M parallel horizontal lines as shown. Next, the vertical adjuster is operated during a blanking time before the next scanning for the field 2 to move the vertical positions of the beams to produce the field 2 below the field 1. At the end of this blanking time, the light of the beams is turned on to allow the polygon scanner to project N×M parallel horizontal lines for the field 2. This operation allows an image of 2×N×M horizontal lines to be formed on the screen.

In actual implementations of the 2-dimensional scanning polygon described here, each facet may deviate from a desired tilt angle by design due to imprecision in manufacturing and other factors. This deviation of the tilt facet angle is an error and can cause errors in vertical positions of different horizontal lines scanned by different facets of the polygon scanner. This facet angle error can degrade the image quality on the screen.

A polygon scanner can be designed and manufactured with a high precision to minimize the facet angle error. Polygons with low facet angle errors, however, can be expensive. To reduce the cost, a facet angle error correction mechanism can be implemented in such a system to correct the known facet angle errors of an installed polygon scanner. Implementation of this correction mechanism allows the use of relatively inexpensive polygons with facet angle errors without compromising the display performance. In addition, the orientations of facets of a polygon scanner may change with time due to various factors, such as a change in temperature and other environmental factors (e.g., humidity), aging of the materials used in a polygon scanner over time, and others. Furthermore, a polygon scanner in a system may be replaced by a different polygon scanner due to malfunction or failure of the original polygon and such replacement can change the facet angle errors because two different polygons tend to have different facet angle errors. Hence, to maintain a high image quality in presence of variations of facet angle errors, the facet angle error correction mechanism can be designed to provide adjustable corrections to the facet angle errors to counteract to different errors associated with different facet angles and variations of the facet angle errors of facets.

For example, the vertical adjuster can be used to make an adjustment to its vertical orientation based on a known facet angle error for a specific polygon facet to correct the effect of the known error. The facet angle errors can be measured and stored in a look-up table. When a facet angle error does not change significantly with temperature, humidity and others, this look-up table method may be sufficient without using the servo feedback based on a measured vertical beam position using the vertical reference mark described above. In implementation, the feedback control needs the identification of the polygon facet that is currently scanning a line and thus can retrieve the corresponding facet angle error value for that polygon facet from the look-up table. The identification of the current polygon facet can be determined from a facet number sensor on the polygon.

In operation, the above facet angle correction based on adjusting the vertical adjuster is activated and applied during the light-off period when transitioning from one facet to a subsequent facet. The scanning control module in the system uses the facet identification number of the subsequent facet to look up and retrieve the facet angle error from the stored look-up table and applies the a correction to the vertical orientation of the vertical scanner to counter the retrieved error. After this correction, the scanning with the subsequent facet begins. This process is executed at every light-off period.

The vertical adjuster may be operated to simply provide the above facet angle correction based on adjusting the vertical adjuster during the light-off period when transitioning from one facet to a subsequent facet, without performing the interlacing and the stacking different fields of images. Under this design, the full frame of the 2-dimensional scanning by the polygon has N×M horizontal scanning lines.

The above techniques and designs for using a 2D polygon scanner and a vertical adjuster to can be implemented in various scanning beam systems other than display systems as described in the above examples. For example, the present scanning systems based on two-dimensional polygon scanner can be used in optical systems that use scanning beams to produce optical patterns. For example, laser printing systems can use the present scanning systems where the screen is replaced by a printing medium (e.g., paper, fabric, or a master printing plate). The printing medium is used to receive the one or more scanning laser beams that carry the images to be formed on the print medium. The images carried by the light can be formed on the printing medium based various photo effects, e.g., photomechanical, photochemical, or laser engraving processes. The printing medium can be a printing plate which is then used to transfer the images onto paper or other printing materials. The lasers in the laser array can be implemented by lasers such as diode lasers that emit at a proper wavelength for the laser printing operation on the printing medium. One specific example is printing systems that produce mask patterns based on laser scanning where rapid turns are desired. This printing can eliminate the need for mask preparation.

While this patent application contains many specifics, these should not be construed as limitations on the scope of an invention or of what may be claimed, but rather as descriptions of features specific to particular embodiments of the invention. Certain features that are described in this patent application in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations, enhancements and other implementations can be made based on what is described and illustrated in this patent application.

What is claimed is:

1. A scanning beam system, comprising:
an optical module operable to produce a plurality of optical beams modulated to carry images to scan over a surface to produce the images on the surface based on a two dimensional scanning pattern,
wherein the optical module comprises:
a polygon scanner positioned in optical paths of the optical beams and comprising a rotation axis around which the polygon scanner rotates to scan the optical beams horizontally on the surface, a plurality of polygon facets that are sized to simultaneously receive the optical beams and comprise a plurality of reflective polygon facets are tilted with respect to the rotation axis at different facet tilt angles, respectively, to scan the optical beams horizontally at different vertical positions on the surface, respectively;
a vertical adjuster placed in the optical paths of the optical beams to control and adjust vertical positions of the optical beams on the surface; and
a control unit that controls the vertical adjuster at a fixed position to place the optical beams at respective fixed vertical positions on the surface when the polygons scanner horizontally scans the optical beams to produce parallel horizontal lines on the surface.

2. The system as in claim 1, wherein:
the control unit is configured to turn off light of the optical beams during a blanking period when positions of the optical beams are near and at the border between two polygon facets, wherein the blanking period corresponds to a duration when each optical beam is positioned within a zone near the edge of the facet by a dimension less than a beam width of each optical beam along the horizontal direction.

3. The system as in claim 1, comprising:
a screen which provides the surface on which the images are displayed and comprises parallel fluorescent stripes substantially perpendicular to the horizontal direction to absorb light of the optical beams to emit visible light which produces the images.

4. The system as in claim 1, wherein:
the two dimensional scanning pattern is an interlaced pattern to form a full frame display by interlacing two or more different patterns of horizontal lines produced by two or more different sequential full rotations of the polygon scanner at different vertical positions of the vertical adjuster, respectively.

5. The system as in claim 4, wherein:
the control unit is configured to turn off light of the optical beams for a blanking period equal to a time duration for the vertical adjuster to adjust a vertical angle to switch from projecting one pattern of horizontal lines to projecting another interlaced pattern of horizontal lines.

6. The system as in claim 1, wherein:
the optical module controls a vertical angle of the vertical adjuster when a reflective polygon facet scans the optical beams to reduce an error in vertical positions of the optical beams on the surface caused by a deviation of the facet tilt angle of the reflective polygon facet from a desired facet tilt angle designed for the reflective polygon facet.

7. The system as in claim 1, wherein:
the vertical adjuster is positioned upstream from the polygon scanner to direct the optical beams to the polygon scanner.

8. The system as in claim 7, wherein:
the polygon scanner and the vertical adjuster are placed at two locations that are horizontally at a center of the surface and the vertical adjuster is closer to the surface than the polygon scanner to direct the optical beams to the polygon scanner at an acute angle with respect to the rotation axis of the polygon scanner.

9. The system as in claim 8, wherein:
the surface is tilted with respect to the rotation axis of the polygon scanner.

10. The system as in claim 1, wherein:
the control unit is configured to control the vertical adjuster to scan the optical beams over a first surface segment at a first fixed position of the vertical adjuster in a full rotation of the polygon scanner and to scan the optical beams over a second surface segment that is vertically displaced from and does not overlap with the first surface segment when the vertical adjuster is at a second fixed position in a subsequent full rotation of the polygon scanner.

11. A scanning beam system, comprising:
an optical module operable to produce a plurality of optical beams modulated to carry images to scan over a surface to produce the images on the surface,
wherein the optical module comprises:
a polygon scanner positioned in optical paths of the optical beams and comprising a rotation axis around which the polygon scanner rotates to scan the optical beams horizontally on the surface, and a plurality of polygon facets that are sized to simultaneously receive the optical beams and reflective to light of the optical beams, the polygon facets tilted with respect to the rotation axis at different tilt angles, respectively, to scan the optical beams horizontally at different vertical positions on the surface, respectively,
a vertical adjuster placed in the optical paths of the optical beams and to control and adjust vertical positions of the optical beams on the surface, and
a scanning control mechanism to synchronize the vertical adjuster to the polygon scanner to adjust vertical positions of the optical beams on the surface to spatially interlace one frame of a sequential sets of simultaneous horizontal scanning lines on the surface produced by the polygon facets, respectively, one set per polygon facet, in one full rotation of the polygon scanner with a subsequent frame of a sequential sets of simultaneous horizontal scanning lines on the surface produced by the polygon facets, respectively, one set per polygon facet, in an immediate subsequent full rotation of the polygon scanner.

12. The system as in claim 11, comprising:
a screen which provides the surface on which the image are displayed and comprises parallel fluorescent stripes substantially perpendicular to the horizontal direction to absorb light of the optical beams to emit visible light which produces the images.

13. The system as in claim 11, wherein:
at least one reflective polygon facet of the polygon scanner has a known deviation in the facet tilt angle from a desired facet tilt angle; and
the scanning control mechanism controls a vertical angle of the vertical adjuster when the reflective polygon facet with the known deviation in the facet tilt angle scans the optical beams to offset a vertical angle of each of the optical beams for reducing an error in vertical positions of the optical beams on the surface caused by the known deviation of the reflective polygon facet.

14. The system as in claim 11, wherein:
the vertical adjuster is positioned upstream from the polygon scanner to direct the optical beams to the polygon scanner.

15. The system as in claim 14, wherein:
the polygon scanner and the vertical adjuster are placed at two locations that are horizontally at a center of the surface and the vertical scanner is closer to the surface than the polygon scanner to direct the optical beams to the polygon scanner at an acute angle with respect to the rotation axis of the polygon scanner.

16. The system as in claim 15, wherein:
the surface is tilted with respect to the he rotation axis of the polygon scanner.

17. A method for scanning optical beams in a scanning beam system, comprising:
producing a plurality of optical beams modulated to carry images to scan over a surface to produce the images on the surface,
using a polygon scanner in optical paths of the optical beams, which comprises a rotation axis around which the polygon scanner rotates and a plurality of polygon facets that are sized to simultaneously receive the optical beams and reflective to light of the optical beams, to scan the optical beams horizontally on the surface, wherein the polygon facets are tilted with respect to the rotation axis at different tilt angles, respectively, to scan the optical beams horizontally at different vertical positions on the surface, respectively, to produce one frame of a sequential sets of simultaneous horizontal scanning lines on the surface produced by the polygon facets, respectively, one set per polygon facet, in one full rotation of the polygon scanner; and
holding a vertical position of each optical beam on at a fixed position when each optical beam is being horizontally scanned on the surface and the light of each optical beam is projected onto the surface, without scanning each optical beam along the vertical direction.

18. The method as in claim 17, comprising:
using a vertical adjuster in the optical paths of the optical beams to control vertical positions of the optical beams on the surface and to adjust vertical positions of the optical beams on the surface to spatially shift horizontal scanning lines in one frame produced in one full rotation of the polygon scanner with horizontal scanning lines of a subsequent frame produced in an immediate subsequent full rotation of the polygon scanner.

19. The method as in claim 17, comprising:
controlling a vertical angle of the vertical adjuster when a reflective polygon facet scans the optical beams to reduce an error in vertical positions of the optical beams on the surface caused by a deviation of the tilt angle of the reflective polygon facet from a desired facet tilt angle designed for the reflective polygon facet.

20. The method as in claim 17, comprising:
using a vertical adjuster in the optical paths of the optical beams to control vertical positions of the optical beams on the surface; and
controlling the optical beams to direct no light of the optical beams to the surface during a time when the vertical scanner adjusts its vertical position between one full rotation of the polygon scanner and an immediate subsequent full rotation of the polygon scanner.

* * * * *

UNITED STATES PATENT AND TRADEMARK OFFICE
CERTIFICATE OF CORRECTION

PATENT NO. : 7,869,112 B2
APPLICATION NO. : 12/180114
DATED : January 11, 2011
INVENTOR(S) : Bruce Borchers and Roger A. Hajjar It is certified that error appears in the above-identified patent and that said Letters Patent is hereby corrected as shown below:

On Title Page 2, in Item (56), under "U.S. PATENT DOCUMENTS", in Column 2, Line 49, please delete "Moikawa et al." and insert -- Morikawa et al. --, therefor.

On Title Page 3, in Item (56), under "OTHER PUBLICATIONS", in Column 1, Line 10, please delete ""Cathodo-," and insert -- "Cathode-, --, therefor.

On Title Page 3, in Item (56), under "OTHER PUBLICATIONS", in Column 2, Line 19, please delete "XVIII," and insert -- XXVIII, --, therefor.

On Title Page 4, in Item (56), under "OTHER PUBLICATIONS", in Column 1, Line 4, please delete "luminesence" and insert -- luminescence --, therefor.

On Title Page 4, in Item (56), under "OTHER PUBLICATIONS", in Column 1, Line 5, please delete "commerical" and insert -- commercial --, therefor.

In Fig. 3, Drawing Sheet 5 of 15, for Tag "370", Line 2, please delete "Opics" and insert -- Optics --, therefor.

In Fig. 8B, Drawing Sheet 12 of 15, please delete "Scree," and insert -- Screen, --, therefor.

In Column 17, Line 27, in Claim 16, please delete "the he" and insert -- the --, therefor.

Signed and Sealed this
Twelfth Day of July, 2011

David J. Kappos
*Director of the United States Patent and Trademark Office*